(12) United States Patent
Zhao et al.

(10) Patent No.: US 11,647,503 B2
(45) Date of Patent: May 9, 2023

(54) INFORMATION TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/408,373

(22) Filed: Aug. 21, 2021

(65) Prior Publication Data

US 2021/0385845 A1 Dec. 9, 2021

Related U.S. Application Data

(63) Continuation of application No. PCT/CN2019/075958, filed on Feb. 22, 2019.

(51) Int. Cl.
*H04W 72/04* (2023.01)
*H04W 72/20* (2023.01)
(Continued)

(52) U.S. Cl.
CPC .......... *H04W 72/20* (2023.01); *H04L 1/1812* (2013.01); *H04L 5/0055* (2013.01); *H04W 72/569* (2023.01); *H04W 4/40* (2018.02)

(58) Field of Classification Search
CPC combination set(s) only.
See application file for complete search history.

(56) References Cited

U.S. PATENT DOCUMENTS 10,455,587 B2 * 10/2019 Seo .................. H04W 52/36
10,779,308 B2 * 9/2020 Patil .................. H04L 5/0064
(Continued)

FOREIGN PATENT DOCUMENTS

| CN | 106559165 A | 4/2017 |
|---|---|---|
| CN | 108347313 A | 7/2018 |

(Continued)

OTHER PUBLICATIONS

International Search Report issued in corresponding International Application No. PCT/CN2019/075958, dated Nov. 13, 2019, 45 pages.
(Continued)

*Primary Examiner* — Hanh N Nguyen
(74) *Attorney, Agent, or Firm* — Bayes PLLC

(57) ABSTRACT

Disclosed in embodiments of the present disclosure are an information transmission method, a terminal device, and a network device. The method includes when a transmission resource used to transmit uplink feedback information and a transmission resource used to transmit sidelink feedback information overlap in a time domain, sending, by a first terminal device, the uplink feedback information or the sidelink feedback information to a network device according to a first criterion. The first criterion includes a relationship between values of a first attribute of sidelink data corresponding to the sidelink feedback information and a first threshold.

18 Claims, 10 Drawing Sheets

(51) Int. Cl.
   *H04L 1/1812*   (2023.01)
   *H04L 5/00*     (2006.01)
   *H04W 72/566*   (2023.01)
   *H04W 4/40*     (2018.01)

(56) References Cited

U.S. PATENT DOCUMENTS

| | | | |
|---|---|---|---|
| 2018/0049220 | A1 | 2/2018 | Patil et al. |
| 2020/0404684 | A1 | 12/2020 | Lee et al. |
| 2021/0105126 | A1* | 4/2021 | Yi .................. H04L 1/1671 |
| 2021/0153065 | A1* | 5/2021 | Adjakple .......... H04W 28/0263 |
| 2021/0195610 | A1* | 6/2021 | Wang .................. H04W 76/14 |
| 2021/0274543 | A1* | 9/2021 | Ryu ................... H04W 72/042 |
| 2021/0321380 | A1* | 10/2021 | Zhao ................. H04L 5/0042 |
| 2022/0103303 | A1* | 3/2022 | Sun ................... H04L 5/0033 |
| 2022/0110069 | A1* | 4/2022 | Wang ................. H04W 52/146 |

FOREIGN PATENT DOCUMENTS

| | | |
|---|---|---|
| CN | 108631952 A | 10/2018 |
| CN | 108809545 A | 11/2018 |
| CN | 109302220 A | 2/2019 |
| CN | 109309518 A | 2/2019 |
| EP | 3893560 A1 | 10/2021 |
| WO | 2017171528 A1 | 10/2017 |
| WO | 2018173235 A1 | 9/2018 |

OTHER PUBLICATIONS

PCT Written Opinion of the International Searching Authority issued in corresponding International Application No. PCT/CN2019/075958, dated Nov. 13, 2019, 12 pages.
"Physical Layer Procedures for NR V2X Sidelink Design", Agenda item: 7.2.4.1.2, Source: Intel Corporation, 3GPP TSG RAN WG1 RAN1#96, R1-1902482, Athens, Greece, Feb. 25 to Mar. 1, 2019.
"Consideration on physical layer procedures", Agenda Item: 7.2.4.1.2, Source: Spreadtrum Communications, 3GPP TSG RAN WG1 Meeting #95, R1-1813075, Spokane, USA, Nov. 12-16, 2018, 6 pages.
Extended European Search Report issued in European Application No. 19915834.6, dated Feb. 2, 2022, 14 pages.
"Discussion on HARQ-ACK feedback for NR-V2X", Agenda Item: 7.2.4.1.2, Source: Fujitsu, 3GPP TSG RAN WG1 Ad-Hoc Meeting 1901, R1-1900248, Taipei, Taiwan, Jan. 21-25, 2019, 8 pages.
First Office Action issued in corresponding Indian application No. 202117040105, dated May 30, 2022.
First Office Action issued in corresponding Chinese application No. 202111076395.X, dated Sep. 27, 2022.
First Office Action issued in corresponding Canadian application No. 3,131,039, dated Oct. 26, 2022.
Second Office Action issued in corresponding Chinese application No. 202111076395.X, dated Jan. 3, 2023.
First Office Action issued in corresponding Japanese application No. 2021-549576, dated Jan. 27, 2023.
First Office Action issued in corresponding European application No. 19915834.6, dated Mar. 15, 2023.
Fujitsu, "Discussion on HARQ-ACK feedback for NR-V2X", R1-1901944, 3GPP TSG RAN WG1 #96 Athens, Greece, Feb. 25-Mar. 1, 2019.
Intel Corporation, "SL V2X user plane aspects", R2-1900883, 3GPP TSG-RAN WG2 Meeting 105 Athens, Greece, Feb. 25-Mar. 1, 2019.
Samsung, "Considerations on Sidelink HARQ Procedure", R1-1902278, 3GPP TSG RAN WG1 #96 Athens, Greece, Feb. 25-Mar. 1, 2019.

* cited by examiner

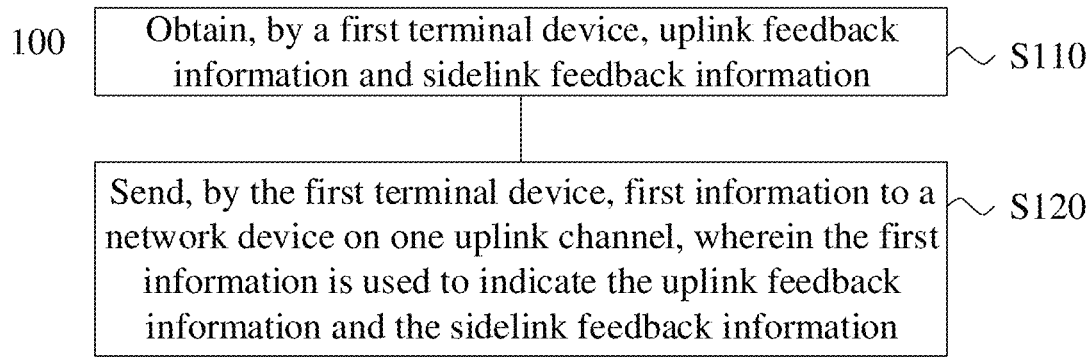
FIG. 4
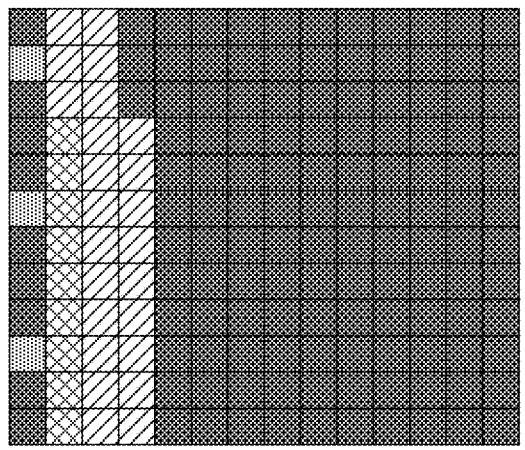
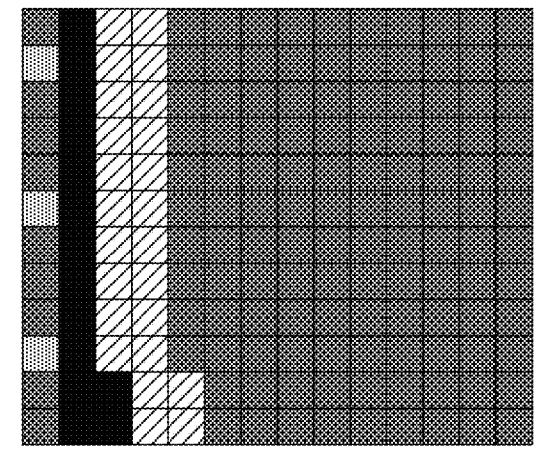
FIG. 5A                FIG. 5B

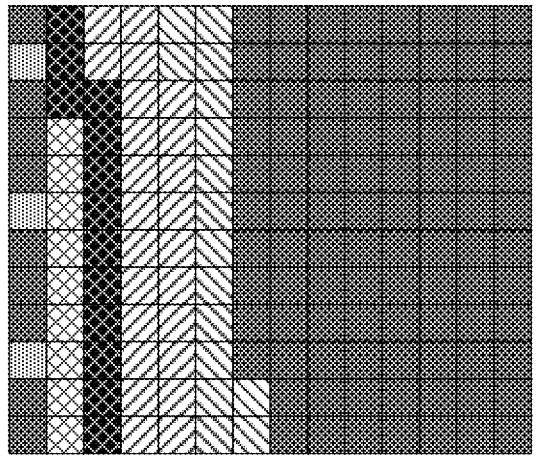
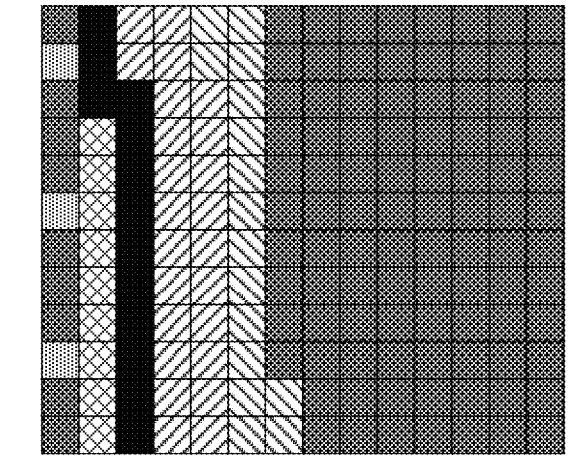
FIG. 6A
FIG. 6B
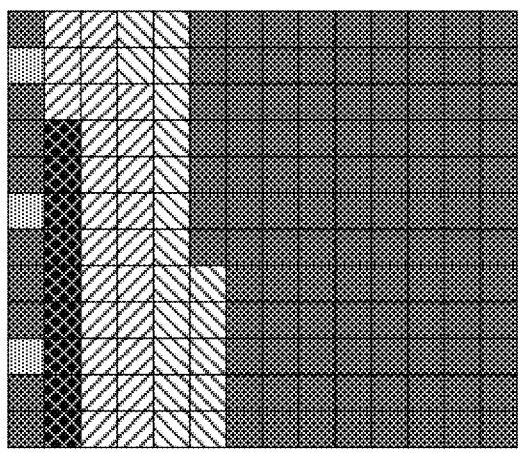
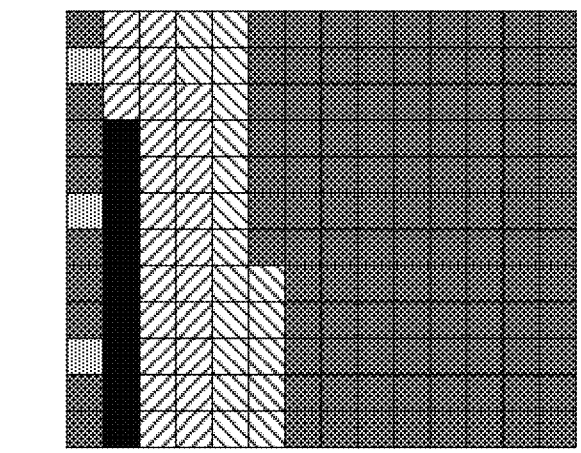
FIG. 7A
FIG. 7B

INFORMATION TRANSMISSION METHOD, TERMINAL DEVICE, AND NETWORK DEVICE

CROSS-REFERENCE TO RELATED APPLICATION

This application is a continuation of International Application No. PCT/CN2019/075958, filed on Feb. 22, 2019, the entire contents of which are incorporated herein by reference.

BACKGROUND

Embodiments of the present disclosure generally relate to communication technologies, and more particularly, to an information transmission method, a terminal and a network device.

In car networking (Internet of Vehicles) systems, if a terminal device receives a downlink data channel or a downlink reference signal sent by a network device, the terminal device needs to send feedback information for the downlink data channel or the downlink reference signal to the network device, that is, uplink feedback information. For example, the uplink feedback information may be a demodulation result of the downlink data channel or a measurement result of the downlink reference signal. If transmission of sidelink data or a sidelink reference signal occurs, the terminal device also needs to send to the network device feedback information for the sidelink data channel or the sidelink reference signal, that is, sidelink feedback information, to assist the network device in resource reallocation.

When the terminal device needs to send both the uplink feedback information and the sidelink feedback information to the network device, there is currently no solution as to how to send the two kinds of feedback information.

SUMMARY

Embodiments of the present disclosure provide an information transmission method, a terminal device and a network device, which can send the uplink feedback information and the sidelink feedback information to the network device at the same time.

According to a first aspect, there is provided an information transmission method, including obtaining, by a first terminal device, uplink feedback information and sidelink feedback information; and sending, by the first terminal device, first information to a network device on one uplink channel, wherein the first information is used to indicate the uplink feedback information and the sidelink feedback information.

According to a second aspect, there is provided an information transmission method, including determining, by the first terminal device, uplink feedback information and sidelink feedback information to be sent to a network device; and sending, by the first terminal device, the uplink feedback information and the sidelink feedback information to the network device on different time domain resources.

According to a third aspect, there is provided an information transmission method, including if a transmission resource used to transmit uplink feedback information and a transmission resource used to transmit sidelink feedback information overlap in a time domain, sending, by a first terminal device, the uplink feedback information or the sidelink feedback information to a network device.

According to a fourth aspect, there is provided an information transmission method, including receiving, by a network device, first information sent from a first terminal device on one uplink channel, wherein the first information is used to indicate uplink feedback information and sidelink feedback information.

According to a fifth aspect, there is provided an information transmission method, including sending, by a network device, first configuration information to a first terminal device, wherein the first configuration information is used to indicate a first transmission resource used to transmit the uplink feedback information; and sending, by the network device, second configuration information to a second terminal device, wherein the second configuration information is used to indicate a second transmission resource used to transmit the sidelink feedback information, and the first transmission resource and the second transmission resource do not overlap in a time domain; and receiving, by the network device, uplink feedback information sent from the first terminal device on the first transmission resource, and receiving sidelink feedback information sent from the first terminal device on the second transmission resource.

According to a sixth aspect, there is provided a terminal device configured to perform the method according to the first aspect or any implementation of the first aspect.

Specifically, the terminal device includes functional modules configured to perform the method according to the first aspect or any implementation of the first aspect.

According to a seventh aspect, there is provided a terminal device configured to perform the method according to the second aspect or any implementation of the second aspect.

Specifically, the terminal device includes functional modules configured to perform the method according to the second aspect or any implementation of the second aspect.

According to an eighth aspect, there is provided a terminal device configured to perform the method according to the third aspect or any implementation of the third aspect.

Specifically, the terminal device includes functional modules configured to perform the method according to the third aspect or any implementation of the third aspect.

According to a ninth aspect, there is provided a network device configured to perform the method according to the fourth aspect or any implementation of the fourth aspect.

Specifically, the network device includes functional modules configured to perform the method according to the fourth aspect or any implementation of the fourth aspect.

According to a tenth aspect, there is provided a network device configured to perform the method according to the fifth aspect or any implementation of the fifth aspect.

Specifically, the network device includes functional modules configured to perform the method according to the fifth aspect or any implementation of the fifth aspect.

According to an eleventh aspect, there is provided a terminal device including a processor and a memory configured to store a computer program, wherein the processor is used to call and run the computer program stored in the memory to perform the method according to the first aspect or any implementation of the first aspect.

According to a twelfth aspect, there is provided a terminal device including a processor and a memory configured to store a computer program, wherein the processor is used to call and run the computer program stored in the memory to perform the method according to the second aspect or any implementation of the second aspect.

According to a thirteenth aspect, there is provided a terminal device including a processor and a memory configured to store a computer program, wherein the processor is used to call and run the computer program stored in the memory to perform the method according to the third aspect or any implementation of the third aspect.

According to a fourteenth aspect, there is provided a network device including a processor and a memory configured to store a computer program, wherein the processor is used to call and run the computer program stored in the memory to perform the method according to the fourth aspect or any implementation of the fourth aspect.

According to a fifteenth aspect, there is provided a network device including a processor and a memory configured to store a computer program, wherein the processor is used to call and run the computer program stored in the memory to perform the method according to the fifth aspect or any implementation of the fifth aspect.

According to a sixteenth aspect, there is provided a chip configured to perform the method according to any one of the first to fifth aspects of any implementation of the first to fifth aspects.

Specifically, the chip includes a processor configured to call and run a computer program stored in a memory to cause a device in which the chip is installed to perform the method according to any one of the first to fifth aspects of any implementation of the first to fifth aspects.

According to a seventeenth aspect, there is provided a computer-readable storage medium configured to store a computer program, wherein the computer program is configured to cause a computer to perform the method according to any one of the first to fifth aspects of any implementation of the first to fifth aspects.

According to an eighteenth aspect, there is provided a computer program product including computer program instructions that cause a computer to perform the method according to any one of the first to fifth aspects of any implementation of the first to fifth aspects.

According to a nineteenth aspect, there is provided a computer program. When the computer program is run on a computer, the computer is caused to perform the method according to any one of the first to fifth aspects of any implementation of the first to fifth aspects.

In the above technical solutions, the first information which indicates both the uplink feedback information and sidelink feedback information at the same time can be sent on one uplink channel, so that both the uplink feedback and the sidelink feedback can be sent to the network device at the same time.

BRIEF DESCRIPTION OF THE DRAWINGS

FIG. 4 is a schematic block diagram of an information transmission method according to an embodiment of the present disclosure.

FIGS. 5A and 5B are schematic diagrams showing resources occupied by HARQ ACK determined by puncturing and rate matching, respectively, according to embodiments of the present disclosure.

FIG. 6A and FIG. 6B are schematic diagrams showing resources occupied by sidelink HARQ ACK determined by puncturing and rate matching, respectively, according to embodiments of the present disclosure.

FIG. 7A and FIG. 7B are schematic diagrams showing resources occupied by multiplexed data feedback information determined by puncturing and rate matching, respectively, according to embodiments of the present disclosure.

DETAILED DESCRIPTION

Figure 1:
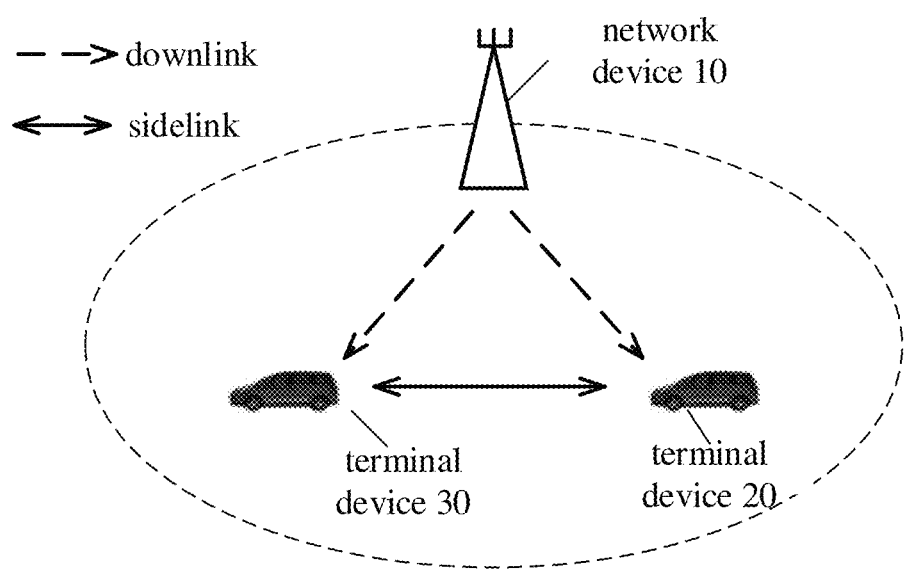
FIG. 1 is a schematic diagram of a sidelink communication system according to an embodiment of the present disclosure.

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

It should be understood that the technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a New Radio (NR) system or a future 5G system, etc.

In particular, the technical solutions of embodiments of the present disclosure can be applied to various communication systems which are based on non-orthogonal multiple access technologies, for example, a Sparse Code Multiple Access (SCMA) system, a Low Density Signature (LDS) system, etc. The SCMA system and the LDS system can also be called other names in the communication field. Further, the technical solutions of embodiments of the present disclosure can be applied to a multi-carrier transmission system which uses non-orthogonal multiple access technology, for example, systems using Orthogonal Frequency Division Multiplexing (OFDM), Filter Bank Multi-Carrier (FBMC), Generalized Frequency Division Multiplexing (GFDM), Filtered-OFDM (F-OFDM), etc.

The terminal device in embodiments of the present disclosure can refer to User Equipment (UE), access terminal, user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in future 5G networks, or a terminal device in the future evolved Public Land Mobile Network (PLMN), etc. Embodiments of the present disclosure do not impose specific limitations on this.

The network device in embodiments of the present disclosure may be a device used for communicating with a terminal device. The network device may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a relay station, an access point, an on-vehicle device, a wearable device, a network device gNB in a future 5G network, or a network device in a future evolved PLMN, etc. Embodiments of the present disclosure do not impose specific limitations on this.

Figure 2:
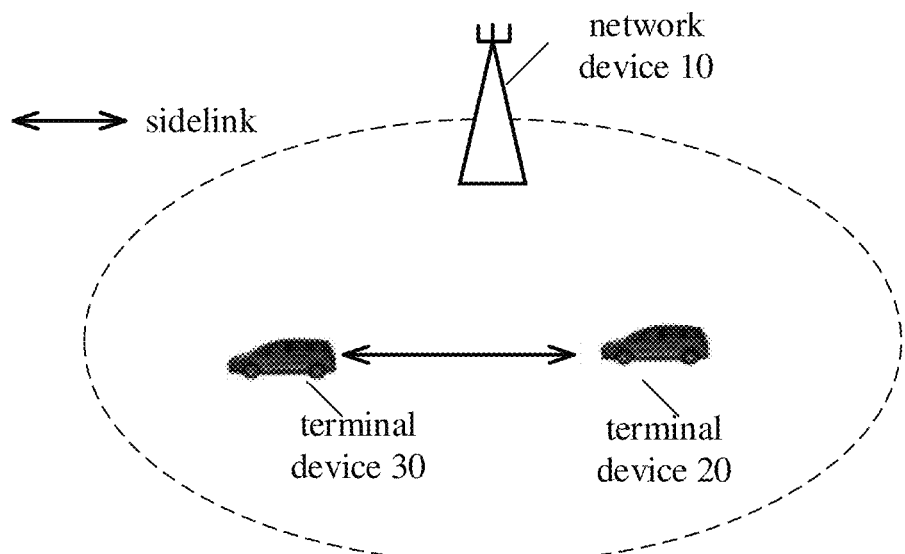
FIG. 2 is a schematic diagram of a sidelink communication system according to an embodiment of the present disclosure.

FIG. 1 and FIG. 2 are schematic diagrams of an application scenario of an embodiment of the present disclosure. FIG. 1 exemplarily shows one network device and two terminal devices. According to some embodiments, the wireless communication system may include multiple network devices and the coverage of each network device may include other numbers of terminal devices, and embodiments of the present disclosure do not impose specific limitations on this. In addition, the wireless communication system may further include other network entities such as Mobile Management Entity (MME), Serving Gateway (S-GW), Packet Data Network Gateway (P-GW), etc. However, embodiments of the present disclosure are not limited to this.

Specifically, a terminal device 20 and a terminal device 30 may communicate with each other in a Device to Device (D2D) communication mode. When performing D2D communication, the terminal device 20 and the terminal device 30 directly communicate with each other via the D2D link, that is, the sidelink (SL). For example, as shown in FIG. 1 or FIG. 2, the terminal device 20 and the terminal device 30 communicate directly through a sidelink. In FIG. 1, the terminal device 20 and the terminal device 30 communicate through the sidelink, and their transmission resources are allocated by a network device. In FIG. 2, the terminal device 20 and the terminal device 30 communicate through the sidelink, and transmission resources are autonomously selected by the terminal devices, and there is no need for the network device to allocate transmission resources.

The D2D communication mode can be applied to Vehicle to Vehicle (V2V) communication or Vehicle to Everything (V2X) communication. In V2X communication, X can generally refer to any device with wireless transmission and reception capabilities, such as but not limited to slow-moving wireless devices, fast-moving vehicle-mounted devices, or network control nodes with wireless transmission and reception capabilities. It should be understood that embodiments of the present disclosure are mainly applied to the scenario of V2X communication, but can also be applied to any other D2D communication scenario, which is not limited in embodiments of the present disclosure.

LTE-V2X is standardized in Release-14 of the 3GPP protocol, and two transmission modes are defined, namely transmission mode 3 and transmission mode 4. Transmission resources for a terminal device using the transmission mode 3 are allocated by a base station, and the terminal device transmits data on the sidelink according to the resources allocated by the base station. The base station can allocate a resource for a single transmission to the terminal device, or the base station can allocate semi-static transmission resources to the terminal device. If a terminal device using the transmission mode 4 has a listening or sensing capability, the terminal device uses a sensing and reservation method to transmit data. If the terminal device does not have the listening or sensing capability, the terminal device randomly selects transmission resources from a resource pool. A terminal device having the listening or sensing capability obtains an available resource set from a resource pool by sensing, and the terminal device randomly selects a resource from the resource set for data transmission. Because the services in the Internet of Vehicles systems have periodic characteristics, terminal devices usually adopts semi-static transmissions. That is, after a terminal device selects a transmission resource, the terminal device will continue to use the resource in multiple transmission cycles, thereby reducing the probability of resource reselection and resource conflicts. The terminal device carries information to reserve resources for a next transmission in control information for the current transmission, so that other terminal devices can determine whether the resources are reserved and used by the terminal device by detecting the control information of the terminal device, and thus resource conflicts can be reduced.

In NR-V2X, automatic driving needs to be supported, and thus higher requirements are put forward for data interaction between vehicles, such as higher throughput, lower delay, higher reliability, larger coverage, more flexible resource allocation, etc.

In the NR-V2X system, multiple transmission modes are introduced, such as mode 1 and mode 2. In mode 1, the network allocates sidelink transmission resources for terminals (similar to mode 3 in LTE-V2X). In mode 2, the terminals select sidelink transmission resources. Mode 2 includes but is not limited to the following modes.

Mode 2a: a terminal autonomously selects transmission resources (similar to mode 4 in LTE-V2X). For example, the terminal autonomously selects resources from a pre-configured or network-configured resource pool (resources can be selected randomly, or resources can be selected by listening).

Mode 2b: A terminal assists other terminals in selecting resources. For example, a first terminal sends auxiliary information to a second terminal. The auxiliary information may include, but is not limited to: available time-frequency resource information, available transmission resource set information, channel measurement information, and channel quality information (such as Channel State Information (CSI), Channel Quality Indicator (CQI), Precoding Matrix Indicator (PMI), rank indication (RI), Reference Signal Received Power, RSRP), Reference Signal Received Quality (RSRQ), Received Signal Strength Indicator (RSSI), path loss information, etc.).

Mode 2c: A terminal selects resources from transmission resources configured for the terminal. For example, the network configures multiple transmission resources for each terminal, and when a terminal has sidelink data transmission, the terminal can select one transmission resource from the multiple transmission resources configured by the network to perform data transmission.

Mode 2d: a first terminal allocates transmission resources to a second terminal. For example, the first terminal is the group head of a group communication, the second terminal is a group member in the group, and the first terminal directly allocates time-frequency resources for sidelink communications.

Figure 3:
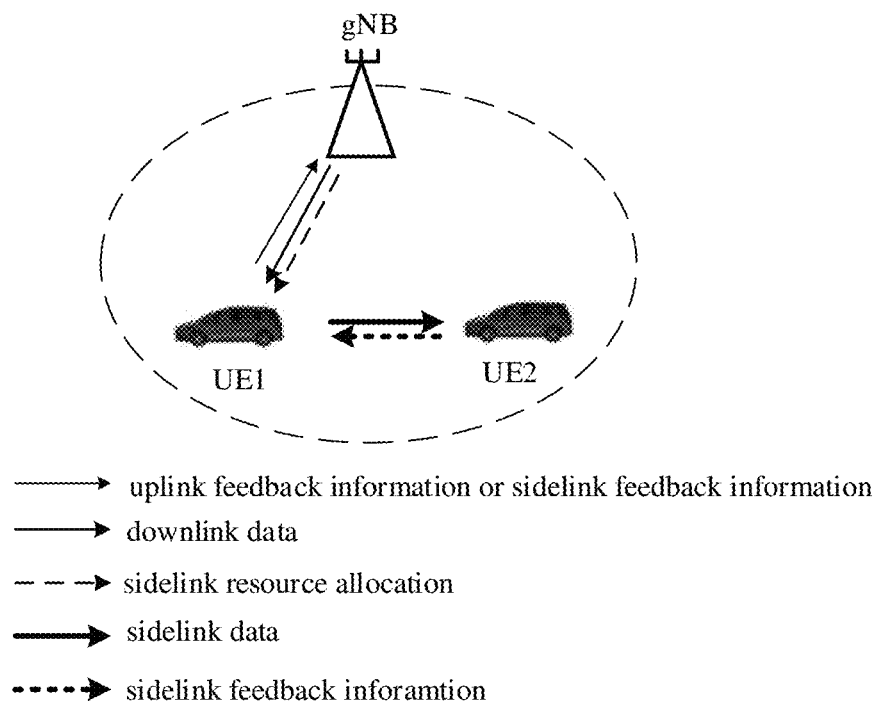
FIG. 3 is a schematic diagram showing transmission of uplink feedback information or sidelink feedback information in the Internet of Vehicles system.

If a terminal device works in mode 1, the sidelink transmission resources for the terminal device are allocated by the network device. If the terminal device receives downlink data or a downlink reference signal sent by the network device, the terminal device needs to send feedback information for the downlink data or the downlink reference signal to the network device, that is, uplink feedback information needs to be sent. For example, the uplink feedback information may be a demodulation result of the downlink data or a measurement result of the downlink reference signal. If the transmission of sidelink data or a sidelink reference signal occurs, the terminal device also needs to send feedback information for the sidelink data or the sidelink reference signal to the network device, that is, the sidelink feedback information needs to be sent, to assist the network device in resource reallocation. For example, a sending terminal device sends sidelink data or a sidelink reference signal to a receiving end terminal device, the sidelink feedback information may be the sidelink feedback information that is obtained by the sending terminal device from the receiving terminal device and is sent by the sending terminal to the network device; or, the sidelink feedback information may be the demodulation result of the received sidelink data or the measurement result of the received sidelink reference signal sent by the receiving terminal device to the network device. As shown in FIG. 3, UE1 receives sidelink resource allocation information sent by gNB, and uses the allocated resource to send sidelink data to UE2. UE2 sends the demodulation result of the sidelink data (that is, sidelink feedback information) to UE1, and UE1 can send the sidelink feedback information to the network device. UE1 can also receive downlink data sent by the gNB and obtains uplink feedback information, and UE1 can send the uplink feedback information to the network device.

When the terminal device sends uplink feedback information to the network device, the uplink feedback information can be carried by a Physical Uplink Control Channel (PUCCH) or a Physical Uplink Shared Channel (PUSCH). When the terminal device sends the sidelink feedback information to the network device, the sidelink feedback information can be carried by the PUCCH or PUSCH. Currently, the terminal device does not support sending two uplink channels at the same time (for example, sending two PUCCHs at the same time, or sending two PUSCHs at the same time, or sending PUCCH and PUSCH at the same time). Therefore, when the terminal device needs to send both uplink feedback information and sidelink feedback information, how to send these two types of feedback information is a problem that needs to be solved.

FIG. 4 is a schematic block diagram of an information transmission method 100 according to an embodiment of the present disclosure. As shown in FIG. 4, the method 100 includes some or all of the following contents.

In S110, a first terminal device obtains uplink feedback information and sidelink feedback information.

In S120, the first terminal device sends first information to a network device on one uplink channel. The first information is used to indicate the uplink feedback information and the sidelink feedback information.

First, it should be noted that the uplink feedback information is a feedback for a downlink data channel or a feedback for downlink reference signal measurement. The sidelink feedback information is a feedback for a sidelink data channel or a feedback for sidelink reference signal measurement. Specifically, the uplink feedback information may be the demodulation result of the downlink data channel or the measurement result of the downlink reference signal, and the sidelink feedback information may be the demodulation result of the sidelink data channel or the measurement result of the sidelink reference signal. For example, the uplink feedback information may include at least one of the following information: Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), Rank Indicator (RI), path loss information, beam information, Reference Signal Received Power (RSRP), Reference Signal Received Quality (RSRQ), Received Signal Strength Indicator (RSSI), and CSI-Reference Signal Resource Indicator (CRI), and so on. The sidelink feedback information may include at least one of the following information: sidelink HARQ ACK, sidelink HARQ NACK, sidelink CSI, sidelink CQI, sidelink RSRP, sidelink RSRQ, sidelink RSSI, sidelink path loss information, sidelink beam information, sidelink PMI, sidelink RI, and sidelink CRI, and so on.

In addition, the first terminal device in embodiments of the present disclosure may be a sending end of a sidelink data channel or a sidelink reference signal. For example, the first terminal device is UE1 in FIG. 3. The first terminal device may also be a receiving end of a sidelink data channel or a sidelink reference signal. For example, the first terminal device is UE2 in FIG. 3.

If the first terminal device is the sending end, the sidelink feedback information is sent by the second terminal device to the first terminal device, and the second terminal device is the receiving end of the sidelink data channel or the sidelink reference signal. Specifically, the first terminal device may send the sidelink data channel and/or the sidelink reference signal to the second terminal device, the second terminal device demodulates the sidelink data channel sent by the first terminal device and/or performs measurement on the sidelink reference signal sent by the first terminal device, and the second terminal device can determine the sidelink feedback information according to the demodulation result and/or the measurement result, and then the second terminal device can send the sidelink feedback information to the first terminal device. The first terminal device processes the sidelink feedback information and sends the sidelink feedback information to the network device.

If the first terminal device is the receiving end, the sidelink feedback information is determined by the first terminal device according to the sidelink data channel or the sidelink reference signal sent by the second terminal device, and the second terminal device is the sending end of the sidelink data channel or the sidelink reference signal. Specifically, the first terminal device receives the sidelink data channel and/or the sidelink reference signal sent by the second terminal device, the first terminal device demodulates the sidelink data channel and/or measures the sidelink reference signal, and determines the sidelink feedback information according to the demodulation result and/or the measurement result. The first terminal device may also process the sidelink feedback information and send the sidelink feedback information to the network device.

Specifically, the first terminal device may obtain both the uplink feedback information and the sidelink feedback information. The first terminal device may perform a joint process on the uplink feedback information and the sidelink feedback information to obtain the first information, and then the first terminal device may send the processed first information to the network device, and indicate the uplink feedback information and the sidelink feedback information to the network device through the first information. The first information may be carried on one uplink channel. For example, the first information may be carried on one PUCCH or one PUSCH. For example, the first terminal device concatenates the information bits of the uplink feedback information and the sidelink feedback information to perform operations such as channel coding, and sends the information to the network device through the same PUCCH. According to some embodiments, the first terminal device may not combine the uplink feedback information and the sidelink feedback information, that is, the uplink feedback information and the sidelink feedback information can be processed independently, and the processed uplink feedback information and the processed sidelink feedback information may be carried on the same uplink channel, for example, may be carried on the same PUCCH or the same PUSCH. For example, the first terminal device performs operations such as channel coding on the uplink feedback information and the sidelink feedback information independently, and sends them to the network device through the same PUSCH, but the uplink feedback information and the sidelink feedback information occupy different resources on the PUSCH.

Therefore, in the information transmission method according to embodiments of the present disclosure, by sending the first information indicating both the uplink feedback information and the sidelink feedback information on one uplink channel, the uplink feedback and the sidelink feedback can be sent to the network device at the same time.

According to some embodiments, the uplink channel is PUCCH. That is, the first terminal device sends the first information on one PUCCH. Specifically, the network device may allocate a PUCCH transmission resource for the first terminal device, and indicate to send the first information on the transmission resource. The first terminal device carries the first information indicating both the uplink feedback information and the sidelink feedback information on the PUCCH, and sends the PUCCH to the network device.

According to some embodiments, the first terminal device may perform a binding operation and/or a multiplexing operation on the uplink feedback information and the sidelink feedback information to generate the first information. Performing a binding operation on a piece of information may refer to performing an AND operation on all information bits of the information, which is also called a bit AND operation, and the information bit after binding is one bit. Performing a multiplexing operation on multiple pieces of information may refer to a concatenation operation of all the information bits of the multiple pieces of information, which can also be called a bit concatenation operation, and the concatenated information bits may be the sum of the information bits of the multiple pieces of information.

Specifically, the first terminal device may generate the first information using any one of the following methods.

Method 1: A bit AND operation is performed on the information bits of the uplink feedback information and the sidelink feedback information. Specifically, the information bits of the uplink feedback information and the sidelink feedback information can be concatenated, and a bit AND operation is performed on all the information bits after the concatenation. Alternatively, a bit AND operation can be performed on the information bits of the uplink feedback information and the sidelink feedback information separately, and then a bit AND operation is performed on the uplink feedback information that has undergone a bit AND operation and the sidelink feedback information that has undergone a bit AND operation. Embodiments of the present disclosure are not limited to this. For example, the uplink feedback information is N bits, and the sidelink feedback information is M bits. The bit AND operation is performed on the concatenated N+M bits to form one bit, which is sent to the network device as the first information.

Method 2: The uplink feedback information and the sidelink feedback information can be concatenated. For example, the uplink feedback information is N bits, and the sidelink feedback information is M bits. After concatenation, M+N bits are formed, which are sent to the network device as the first information.

Method 3: A bit AND operation is performed on the information bits of the uplink feedback information and the sidelink feedback information separately, and the uplink feedback information that has undergone the bit AND operation and the sidelink feedback information that has undergone the bit AND operation can be concatenated. For example, the uplink feedback information is N bits, and the sidelink feedback information is M bits. The uplink feedback information that has undergone the bit AND operation and the sidelink feedback information that has undergone the bit AND operation are each one bit, and after concatenation, the concatenated information bits are two bits, which are sent to the network device as the first information.

Method 4: A bit AND operation may be performed on the uplink feedback information, and the uplink feedback information that has undergone the bit AND operation and the sidelink feedback information may be concatenated. For example, the uplink feedback information is N bits, and the sidelink feedback information is M bits. The uplink feedback information after the AND operation is one bit, and the uplink feedback information after the AND operation and the sidelink feedback information are concatenated to form 1+M bits, which are sent to the network device as the first information.

Method 5: A bit AND operation may be performed on the sidelink feedback information, and the sidelink feedback information that has undergone the bit AND operation and the uplink feedback information may be concatenated. For example, the uplink feedback information is N bits, and the sidelink feedback information is M bits. The sidelink feedback information after the AND operation is one bit, and the sidelink feedback information after the AND operation and the uplink feedback information are concatenated to form 1+N bits, which are sent to the network device as the first information.

It should be understood that, in the above methods, the order of the information bits of the uplink feedback information and the sidelink feedback information in the first information is not limited. For example, the uplink feedback information can be followed by the sidelink feedback information, or the sidelink feedback information can be followed by the uplink feedback information.

After the network device receives the first information, the network device can determine the demodulation result of the downlink data channel or the sidelink data channel, or the measurement result of the downlink reference signal or the sidelink reference signal according to the first information. The following describes the operations after the network device receives the first information in the above methods with the feedback information for the data channel as an example. For example, if it is determined to be HARQ NACK, the network device can consider that the demodulation has failed, and the network device can continue to allocate retransmission resources. If it is determined to be HARQ ACK, the network device can consider that the demodulation is successful, and i the network device allocates retransmission resources when the previous transmission resource is allocated, the network device can reschedule and allocate the retransmission resources. If it is determined to be a Discontinuous Transmission (DTX) state, the network device can consider that the demodulation has failed, and the network device can continue to allocate retransmission resources.

In method 1, if the 1-bit first information received by the network device indicates HARQ NACK, it can be considered that the contents of the uplink feedback information and sidelink feedback information are HARQ NACK, and then the network device can consider that the demodulations of the downlink data channel and the sidelink data channel corresponding to the first information all fail. If the 1-bit first information received by the network device indicates HARQ ACK, it can be considered that the contents of the uplink feedback information and sidelink feedback information are HARQ ACK, and then the network device can consider that the demodulations of the downlink data channel and the sidelink data channel corresponding to the first information all succeed.

In method 2, if each information bit in the uplink feedback information corresponds to a downlink data channel, and each information bit in the sidelink feedback information corresponds to a sidelink data channel, then each information bit in the first information corresponds to a demodulation result of a downlink data channel or a sidelink data channel. If a bit is HARQ ACK, it means that the corresponding downlink data channel or sidelink data channel is successfully demodulated; if a bit is HARQ NACK, it means that the demodulation of the corresponding downlink data channel or sidelink data channel failed.

In method 3, if each information bit in the uplink feedback information corresponds to a downlink data channel, and each information bit in the sidelink feedback information corresponds to a sidelink data channel, then two bits in the first information correspond to all downlink data channels and all sidelink data channels. If a bit in the first information is HARQ ACK, it means that the downlink data channel or sidelink data channel corresponding to the bit is successfully demodulated; if a bit is HARQ NACK, it means that the demodulation of the downlink data channel or the sidelink data channel corresponding to the bit failed.

In method 4, if each information bit in the uplink feedback information corresponds to a downlink data channel, and each information bit in the sidelink feedback information corresponds to a sidelink data channel, then the first or last one bit in the first information corresponds to all the uplink feedback information, and each other information bit corresponds to a sidelink data channel. If the bit for the uplink feedback information is HARQ ACK, it means that all the downlink data channels are demodulated successfully. If the bit for the uplink feedback information is HARQ NACK, it means that the demodulation of all the downlink data channels failed. If a bit for the sidelink feedback information is HARQ ACK, it means that the sidelink data channel corresponding to the bit is demodulated successfully. If a bit for the sidelink feedback information is HARQ NACK, it means that the demodulation of the sidelink data channel corresponding to the bit failed.

In method 5, if each information bit in the uplink feedback information corresponds to a downlink data channel, and each information bit in the sidelink feedback information corresponds to a sidelink data channel, then the first or last one bit in the first information corresponds to all sidelink feedback information, and each other information bit corresponds to a downlink data channel. If the bit for the sidelink feedback information is HARQ ACK, it means that all the sidelink data channels are successfully demodulated. If the bit for the sidelink feedback information is HARQ NACK, it means that the demodulation of all the sidelink data channels failed. If a bit for the uplink feedback information is HARQ ACK, it means that the downlink data channel corresponding to the bit is successfully demodulated. If a bit for the uplink feedback information is HARQ NACK, it means that the demodulation of the downlink data channel corresponding to the bit failed.

According to some embodiments, the sidelink feedback information may include first sidelink feedback information and second sidelink feedback information. The first sidelink feedback information may be a feedback for a sidelink data channel and/or a sidelink reference signal sent from the first terminal device to the second terminal device, that is, the first sidelink feedback information is sent from the second terminal device to the first terminal device. The second sidelink feedback information may be a feedback for a sidelink data channel and/or a sidelink reference signal received by the first terminal device from the second terminal device, that is, the second sidelink feedback information is obtained according to the demodulation result of the received sidelink data channel and/or the measurement result of the sidelink reference signal.

According to some embodiments, the sidelink feedback information may include feedback information for at least one sidelink data channel and/or sidelink reference signal. For example, the sidelink feedback information includes third sidelink feedback information and fourth sidelink feedback information. The third sidelink feedback information is feedback information for a sidelink data channel and/or a sidelink reference signal between the first terminal device and the second terminal device. The fourth sidelink feedback information is feedback information for a sidelink data channel and/or a sidelink reference signal between the first terminal device and a third terminal device.

It should be understood that, in embodiments of the present disclosure, the first information may be used to indicate multiple types of feedback information. For example, the first information indicates the first sidelink feedback information and the second sidelink feedback information as described above. For another example, the first information indicates the uplink feedback information and various sidelink feedback information. For another example, the first information indicates data feedback information and channel feedback information. Embodiments of the present disclosure should not be limited to the first information described herein indicating the uplink feedback information and the sidelink feedback information.

According to some embodiments, if the sidelink feedback information sent from the second terminal device is not received by the first terminal device as the sending end, or if the first terminal device detects that a state of sidelink feedback information in response to the sidelink data channel or the sidelink reference signal sent to the second terminal device is a discontinuous transmission (DTX) state, the first terminal device sets the sidelink feedback information to be sent to the network device as NACK. For example, the first terminal device sends a Physical Sidelink Control Channel (PSCCH) and a Physical Sidelink Shared Channel (PSSCH) to the second terminal device. If the PSCCH is not detected by the second terminal device, the PSSCH will not be detected, and therefore the second terminal device does not send the sidelink feedback information to the first terminal device. Then, the first terminal device cannot detect the sidelink feedback information, and it can be considered that the state of the sidelink feedback information detected by the first terminal device at this time is the DTX state. The first terminal device can set the sidelink feedback information to be sent to the network device as HARQ NACK. After the network device receives the sidelink feedback information, the network device can reallocate sidelink transmission resources.

According to some embodiments, the uplink channel is PUSCH. That is, the first terminal device sends the first information on one PUSCH. Specifically, the network device may allocate PUSCH transmission resources to the first terminal device, and indicate to send the first information on the transmission resources. The first terminal device carries the first information indicating both the uplink feedback information and the sidelink feedback information on the PUSCH, and send the PUSCH to the network device.

According to some embodiments, the first information occupies a first transmission resource on the PUSCH, and the first transmission resource may be determined by puncturing or rate matching. The size of the first transmission resource may be determined according to the first information, and the starting position of the first transmission resource may be predefined by a protocol or determined by a network device configuration. The so-called puncturing means that, on the resources for the PUSCH, the resources available for the first information and the resources available for the data partially overlap, and when calculating the available resources for the data, the resources that overlap with the first information are included; according to the size of the available resources, operations such as encoding and rate matching are performed on the data, the first information is on mapped on the overlapping resources, but the data is not mapped on the overlapping resources, that is, the data is punctured by the first information. Specifically, the data may be mapped to the PUSCH resource first; according to the size and location of the resources occupied by the first information, the data on the PUSCH resources may be punctured, that is, the first information covers a part of the data on the PUSCH resources. Alternatively, the first information is mapped to the PUSCH resources according to the size and locations of the resources occupied by the first information, and when data is mapped, data is not mapped on the resources already occupied by the first information. The rate matching refers to that, on the resources for PUSCH, the resources available for the first information and the resources available for the data are orthogonal; when calculating the available resources for the data, the resources used by the first information are excluded, and based on the size of the remaining available resources, the data is encoded and rate-matched.

According to the foregoing examples of the uplink feedback information and the sidelink feedback information, the first information may be divided into data feedback information and channel feedback information. The resources occupied by the data feedback information can be determined by puncturing or rate matching, and the channel feedback information can be determined by rate matching. The data feedback information may include at least one of: HARQ ACK, HARQ NACK, sidelink HARQ ACK, and sidelink HARQ NACK. The channel feedback information includes at least one of the following information: CSI, CQI, PMI, RI, path loss information, beam information, RSRP, RSRQ, RSSI, CRI, sidelink CSI, sidelink CQI, sidelink RSRP, sidelink RSRQ, sidelink RSSI, sidelink path loss information, sidelink beam information, sidelink PMI, and sidelink RI.

For example, if the bit sequence of the data feedback information is less than or equal to K bits, the resource occupied by the data feedback information is determined by puncturing. If the bit sequence of the data feedback information is greater than K bits, the resource occupied by the data feedback information is determined by rate matching, where K is a positive integer.

Referring to FIG. 5A and FIG. 5B, uplink data, HARQ ACK, and CSI can occupy all of PUSCH resources except Demodulation Reference Signal (DMRS). According to some embodiments, the HARQ ACK occupies a resource on a symbol which is a previous or next symbol of the symbol where the DMRS is located. In FIG. 5A, the resource occupied by HARQ ACK is determined by puncturing. In FIG. 5B, the resources occupied by HARQ ACK are determined by rate matching. In FIG. 5A and FIG. 5B, the resources occupied by CSI are determined by rate matching.

When the data feedback information includes both data feedback information for downlink data and data feedback information for sidelink data, the data feedback information for the downlink data and the data feedback information for the sidelink data can occupy orthogonal resources on the PUSCH. The so-called orthogonal resources refer to resources that are orthogonal in the time domain, frequency domain, code domain, or space domain. For example, HARQ ACK and/or HARQ NACK occupies a second transmission resource on the PUSCH, sidelink HARQ ACK and/or sidelink HARQ NACK occupies a third transmission resource on the PUSCH, and the second transmission resource and the third transmission resource are orthogonal resources.

Referring to FIG. 6A and FIG. 6B, uplink data, HARQ ACK, sidelink HARQ ACK, CSI, and sidelink CSI can occupy all the PUSCH resources except DMRS. In FIG. 6A, the resources occupied by HARQ ACK and sidelink HARQ ACK are determined by puncturing. In FIG. 6B, the resources occupied by HARQ ACK are determined by puncturing, and the resources occupied by sidelink HARQ ACK are determined by rate matching. The sidelink HARQ ACK and HARQ ACK use orthogonal resources, and the sidelink CSI and CSI also use orthogonal resources. In FIG. 6A and FIG. 6B, the resources occupied by the CSI and the sidelink CSI are determined by rate matching.

According to some embodiments, the data feedback information for the downlink data and the data feedback information for the sidelink data may be processed first, and then according to the size of the processed bit sequence, whether to determine the data feedback information in the first information by puncturing or rate matching can be determined. For example, the number of information bits of HARQ ACK and/or HARQ NACK is N, and the number of the information bits of sidelink HARQ ACK and/or HARQ NACK is M, and HARQ ACK and/or HARQ NACK and sidelink HARQ ACK and/or HARQ NACK are concatenated. The information bits after concatenation are M+N. If M+N is less than or equal to K, the resources occupied by the data feedback information are determined by puncturing; if M+N is greater than K, the resources occupied by the data feedback information are determined by rate matching; K is a positive integer.

Referring to FIG. 7A and FIG. 7B, uplink data, data feedback information concatenation, CSI, and sidelink CSI can occupy all of the PUSCH resources except DMRS. In FIG. 7A, the resources occupied by the concatenated data feedback information are determined by punching. In FIG. 7B, the resources occupied by the concatenated data feedback information are determined by rate matching. In FIG. 7A and FIG. 7B, the resources occupied by the CSI and the sidelink CSI are determined by rate matching.

According to some embodiments, it is also possible to perform the operations as described above in the method 1 to method 5 on the data feedback information for the downlink data and the data feedback information for the sidelink data, and determine whether the resources occupied by the data feedback information are obtained by puncturing or rate matching according to the size of the bit sequence of the data feedback information after the operations.

According to some embodiments, the aforementioned parameter K may be a parameter predefined by a protocol or configured by the network. For example, K can be 2. When there is a relatively small number of information bits, the puncturing method is adopted, which does not affect the bit error rate of the data, and the operation is simple. When there is a relatively a large number of information bits, the rate matching method is adopted, and the bit error rate of the data will not increase due to puncturing of the data.

Figure 8:
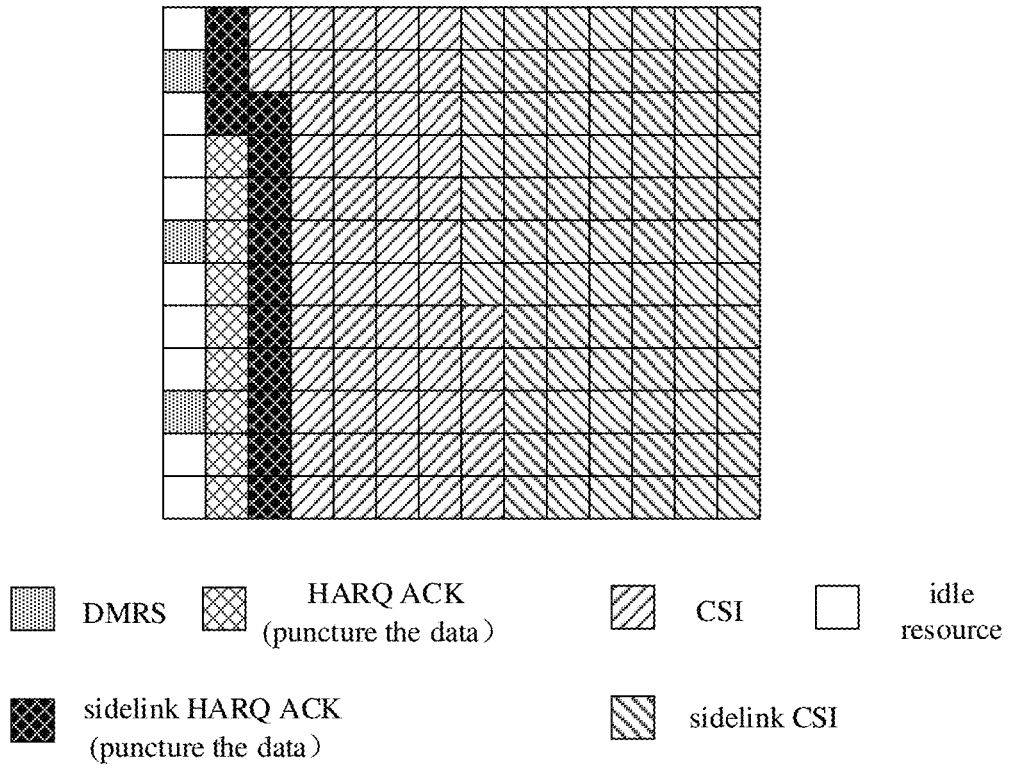
FIG. 8 is a schematic diagram of resource distribution for feedback information when there is no uplink data transmission on PUSCH according to an embodiment of the present disclosure.

In embodiments of the present disclosure, when there is no uplink data transmission on the PUSCH, the first information may occupy all of the PUSCH resources except the resources occupied by the DMRS, or the first information may occupy all of the PUSCH resources except time domain symbols occupied by the DMRS. Referring to FIG. 8, HARQ ACK, sidelink HARQ ACK, CSI, and sidelink CSI occupy all resources of PUSCH resources except the time domain symbols occupied by the DMRS, and the unoccupied resources on the time domain symbols occupied by DMRS are idle resources.

According to some embodiments, the uplink feedback information and the sidelink feedback information in the first information can be transmitted through orthogonal resources on the PUSCH. As shown in FIG. 6A and FIG. 6B, the uplink feedback information includes HARQ ACK and CSI, and the sidelink feedback information includes the sidelink HARQ ACK and sidelink CSI. The resources occupied by HARQ ACK and CSI are orthogonal to the resources occupied by the sidelink HARQ ACK and sidelink CSI.

According to some embodiments, the data feedback information and channel feedback information in the first information may be transmitted through orthogonal resources on the PUSCH. As shown in FIG. 6A and FIG. 6B, the data feedback information includes HARQ ACK and sidelink HARQ ACK, and the channel feedback information includes CSI and sidelink CSI. The resources occupied by HARQ ACK and sidelink HARQ ACK and the resources occupied by CSI and sidelink CSI are orthogonal resources.

According to some embodiments, before transmitting the first information, the first terminal device first determines a transmission resource for the uplink channel that carries the first information.

In an implementation, the first terminal device may obtain first configuration information. The first configuration information is used to indicate a fourth transmission resource used to transmit the uplink feedback information. For example, the network device may allocate a transmission resource for transmitting the uplink feedback information to the first terminal device. The first terminal device may also obtain second configuration information. The second configuration information is used to indicate a fifth transmission resource used to transmit the sidelink feedback information. For example, the network device may also allocate a transmission resource for transmitting the sidelink feedback information to the first terminal device. The first terminal device may choose to send the uplink channel carrying the first information on the fourth transmission resource or the fifth transmission resource. According to some embodiments, the first terminal device may select one of the fourth transmission resource or the fifth transmission resource as the transmission resource for the uplink channel carrying the first information according to the sequential order of the fourth transmission resource or the fifth transmission resource in the time domain. For example, the first terminal device may select an earlier transmission resource in the time domain. According to some embodiments, the first terminal device may select one of the fourth transmission resource or the fifth transmission resource as the transmission resource for the uplink channel carrying the first information according to an order in which the first terminal device obtains the first configuration information or the second configuration information. For example, if the first terminal device first obtains the first configuration information, the first terminal device may select the fourth transmission resource to send the uplink channel that carries the first information. According to some embodiments, the first terminal device may determine the transmission resource for the uplink channel carrying the first information according to the type of the uplink channel. For example, if the first configuration information indicates the fourth transmission resource, the uplink channel on the resource is PUCCH, the second configuration information indicates the fifth transmission resource, and the uplink channel on the resource is PUSCH, then the first terminal device may select the fifth transmission resource, and send the PUSCH channel carrying the first information on the resource.

If the feedback information is data feedback information, the network device may allocate transmission resources for downlink data or sidelink data to the first terminal device and at the same time allocate the transmission resources for the feedback information corresponding to the downlink data or sidelink data to the first terminal device. That is, the first configuration information may be further used to indicate a transmission resource used to transmit downlink data, and the second configuration information may further be used to indicate a transmission resource used to transmit sidelink data. For example, the first terminal device may also receive a first Physical Downlink Control Channel (PDCCH) sent by the network device. The first PDCCH is used to indicate transmission resources used to transmit PSCCH and/or PSSCH, and the first PDCCH may be further used to indicate transmission resources used to transmit the sidelink feedback information for the PSSCH. The first terminal device can receive a second PDCCH sent by the network device. The second PDCCH is used to indicate transmission resources for the Physical Downlink Shared Channel (PDSCH), and the second PDCCH can also be used to indicate the transmission resources for the uplink feedback information for the PDSCH. The first PDCCH and the second PDCCH may be different.

The first terminal device may not be able to detect the PDCCHs, and following scenarios may exist.

Scenario 1: The first PDCCH is detected by the first terminal device, but the second PDCCH is not detected. Therefore, the first terminal device sends sidelink feedback information to the network device, but does not send uplink feedback information.

Scenario 2: The second PDCCH is detected by the first terminal device, but the first PDCCH is not detected. Therefore, the first terminal device sends uplink feedback information to the network device, but does not send sidelink feedback information.

Scenario 3: Neither of the first PDCCH and the second PDCCH is detected. Therefore, the first terminal device neither sends uplink feedback information nor sidelink feedback information to the network device.

Scenario 4: Both the first PDCCH and the second PDCCH are detected by the first terminal device. Therefore, the first terminal device sends both the uplink feedback information and the sidelink feedback information to the network device.

If the first terminal device does not send some kind of feedback information to the network device, the network device does not know whether the corresponding PDCCH is detected by the first terminal device, and the network device still needs to perform detection on the transmission resources for the feedback information as indicated by the PDCCH. The network device can first perform detection assuming that both the uplink feedback information and the sidelink feedback information are sent. If the detection fails, the network device performs detection assuming that only the uplink feedback information or the sidelink feedback information is sent. If the detection fails, the network device performs detection assuming that the first terminal device does not feed any information back, i.e., the corresponding state is DTX state.

In an alternative embodiment, the network device may directly allocate the transmission resource for the uplink channel carrying the first information to the first terminal device, and the first terminal device does not need to perform selection between two transmission resources.

In another alternative embodiment, the first terminal device may obtain third configuration information. The third configuration information is used to indicate a sixth transmission resource used for transmitting downlink data corresponding to the uplink feedback information or seventh transmission resource used for transmitting sidelink data corresponding to the sidelink feedback information. The first terminal device may determine the transmission resource for the uplink channel carrying the first information according to the sixth transmission resource or the seventh transmission resource. That is, the sixth transmission resource or the seventh transmission resource can implicitly indicate the transmission resource for the uplink channel. For example, the time domain resource for the uplink channel may be the next time slot of the sixth transmission resource or the seventh transmission resource, and occupy the last two time domain symbols in the time slot. The starting position of the frequency domain resource for the uplink channel may be determined according to the frequency domain starting position of the sixth transmission resource or the seventh transmission resource. The length of the frequency domain resource may be predefined or the same as the length of the frequency domain resource of the sixth transmission resource or the seventh transmission resource.

Figure 9:
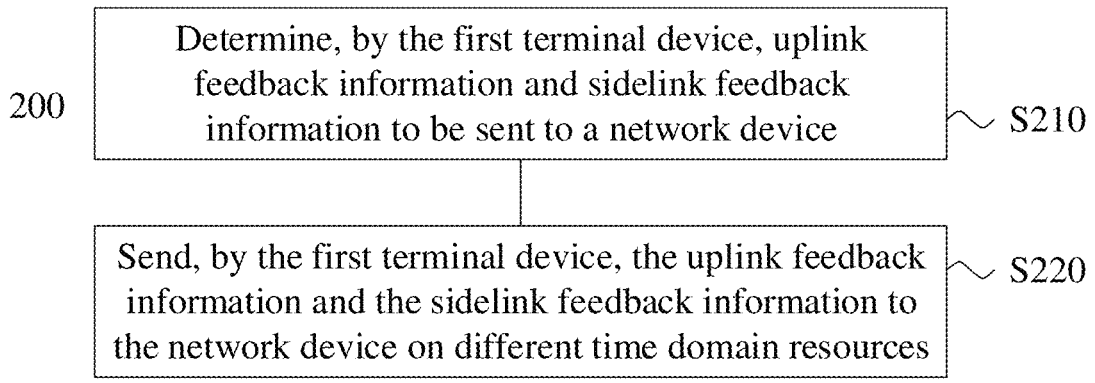
FIG. 9 is a schematic block diagram of an information transmission method according to an embodiment of the present disclosure.

FIG. 9 is a schematic block diagram of an information transmission 200 according to an embodiment of the present disclosure. As shown in FIG. 9, the method 200 includes some or all of the following contents.

In S210, the first terminal device determine uplink feedback information and sidelink feedback information to be sent to a network device.

In S220, the first terminal device sends the uplink feedback information and the sidelink feedback information to the network device on different time domain resources.

First, it should be noted that the uplink feedback information is a feedback for a downlink data channel or a feedback for downlink reference signal measurement. The sidelink feedback information is a feedback for a sidelink data channel or a feedback for sidelink reference signal measurement. Specifically, the uplink feedback information may be the demodulation result of the downlink data channel or the measurement result of the downlink reference signal, and the sidelink feedback information may be the demodulation result of the sidelink data channel or the measurement result of the sidelink reference signal. For example, the uplink feedback information may include at least one of the following information: HARQ ACK, HARQ NACK, CSI, CQI, PMI, RI, path loss information, beam information, RSRP, RSRQ, RSSI, and CRI, and so on. The sidelink feedback information may include at least one of the following information: sidelink HARQ ACK, sidelink HARQ NACK, sidelink CSI, sidelink CQI, sidelink RSRP, sidelink RSRQ, sidelink RSSI, sidelink path loss information, sidelink beam information, sidelink PMI, and sidelink RI and so on.

In addition, the first terminal device in embodiments of the present disclosure may be a sending end of a sidelink data channel or a sidelink reference signal. For example, the first terminal device is UE1 in FIG. 3. The first terminal device may also be a receiving end of a sidelink data channel or a sidelink reference signal. For example, the first terminal device is UE2 in FIG. 3.

If the first terminal device is the sending end, the sidelink feedback information is sent by the second terminal device to the first terminal device, and the second terminal device is the receiving end of the sidelink data channel or the sidelink reference signal. Specifically, the first terminal device may send the sidelink data channel and/or the sidelink reference signal to the second terminal device, the second terminal device demodulates the sidelink data channel sent by the first terminal device and/or performs measurement on the sidelink reference signal sent by the first terminal device, and the second terminal device can determine the sidelink feedback information according to the demodulation result and/or the measurement result, and then the second terminal device can send the sidelink feedback information to the first terminal device. The first terminal device processes the sidelink feedback information and sends the sidelink feedback information to the network device.

If the first terminal device is the receiving end, the sidelink feedback information is determined by the first terminal device according to the sidelink data channel or the sidelink reference signal sent by the second terminal device, and the second terminal device is the sending end of the sidelink data channel or the sidelink reference signal. Specifically, the first terminal device receives the sidelink data channel and/or the sidelink reference signal sent by the second terminal device, the first terminal device demodulates the sidelink data channel and/or measures the sidelink reference signal, and determines the sidelink feedback information according to the demodulation result and/or the measurement result. The first terminal device may also process the sidelink feedback information and send the sidelink feedback information to the network device.

According to some embodiments, the first terminal device does not expect to send the uplink feedback information and the sidelink feedback information at the same time. The time domain resources for the uplink feedback information and the sidelink feedback information may be different through the scheduling of the network device, thereby ensuring that the first terminal device sends only one type of feedback information at a time moment.

Figure 10:
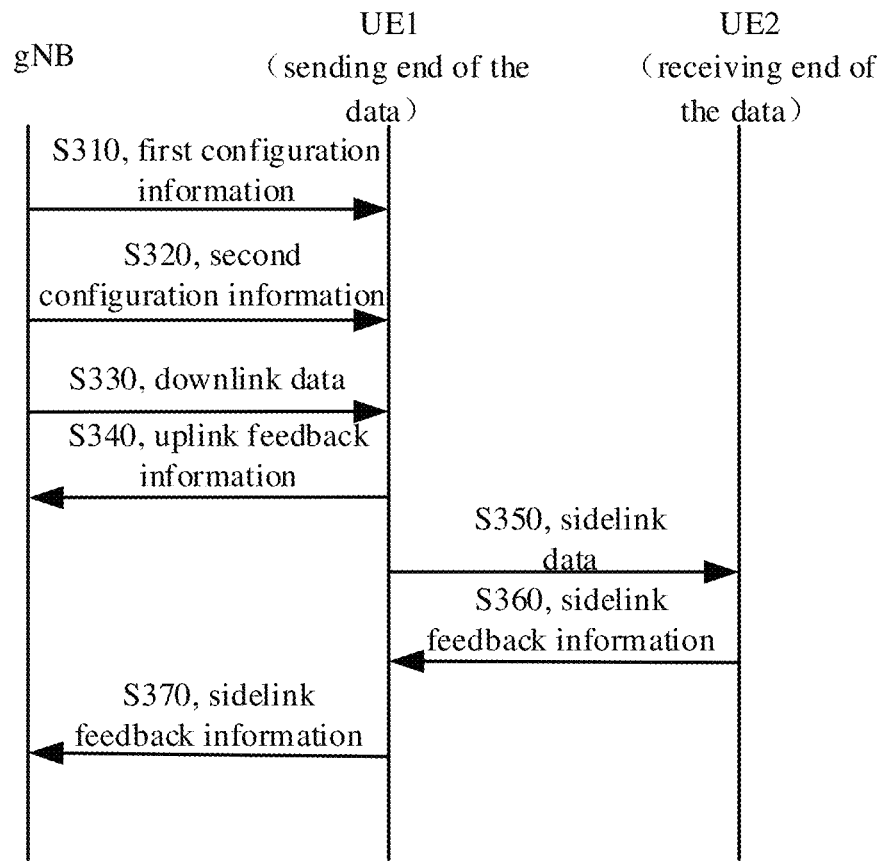
FIG. 10 is a schematic flowchart of an information transmission method according to an embodiment of the present disclosure.

An information transmission method 300 according to an embodiment of the present disclosure will be described in detail below with reference to FIG. 10. As shown in FIG. 10, the method 300 includes at least part of the following contents.

In S310, UE1 (the sending end of the sidelink data) may obtain first configuration information from gNB (the network device). The first configuration information is used to indicate a first transmission resource used to transmit uplink feedback information.

In S320, UE1 may also obtain second configuration information from the gNB. The second configuration information is used to indicate a second transmission resource used for transmitting sidelink feedback information. The first transmission resource and the second transmission resource do not overlap in the time domain.

In S330, the gNB may send downlink data to UE1.

In S340, the UE1 may send uplink feedback information for the downlink data to the gNB on the first transmission resource.

In S350, UE1 may send sidelink data to UE2 (the receiving end of sidelink data).

In S360, UE2 may send sidelink feedback information for the sidelink data to UE1.

In S370, UE1 may send sidelink feedback information to the network device on the second transmission resource.

It should be understood that in embodiments of the present disclosure, the sequence numbers of the above-mentioned processes does not mean the order for performing the steps. The order of the processes should be determined by their functions and internal logic, and should not be considered as constituting any limitation on the implementations of the present disclosure.

According to some embodiments, while allocating transmission resources for downlink data or sidelink data to UE1, the network device may allocate transmission resources for feedback information corresponding to the downlink data or sidelink data to UE1. That is, the first configuration information may also be used to indicate a transmission resource used to transmit the downlink data, and the second configuration information may also be used to indicate a transmission resource used to transmit the sidelink data. For example, UE1 may receive a first PDCCH sent by a network device. The first PDCCH is used to indicate transmission resources for transmitting PSCCH and/or PSSCH, and the first PDCCH may also be used to indicate the transmission resources for the sidelink feedback information for PSSCH. UE1 may receive a second PDCCH sent by the network device, the second PDCCH is used to indicate the transmission resources used to transmit the PDSCH, and the second PDCCH may also be used to indicate the transmission resource used to transmit the uplink feedback information for the PDSCH. The first PDCCH and the second PDCCH may be different.

According to some embodiments, the transmission resource for UE2 to send the sidelink feedback information to UE1 may be determined using the following methods.

First Method: The gNB determines the transmission resource for UE2 to send the sidelink feedback information to UE1. For example, the gNB may send the allocated transmission resource to UE1, and then UE1 sends the transmission resource to UE2. For another example, the gNB may directly send the allocated transmission resource to UE2.

Second Method: UE1 can determine the transmission resource for UE2 to send the sidelink feedback information to UE1. UE1 may carry the indication information of the transmission information by Sidelink Control Information (SCI) or PSSCH, and sends the SCI or PSSCH to UE2.

Third Method: The transmission resource for UE2 to send the sidelink feedback information to UE1 can be implicitly indicated by the transmission resource for UE1 to send sidelink data to UE2. For example, the time domain resource for the sidelink feedback information may be the next time slot of the transmission resource for the sidelink data, and occupy the last two time domain symbols in the time slot. The starting position of the frequency domain resource may be the same as the frequency domain starting position of the transmission resource for the sidelink data. The length of the frequency domain resource may be predefined or the same as the length of the frequency domain resource of the transmission resource for the sidelink data.

According to some embodiments, the sidelink feedback information sent by the UE1 to the network device may be feedback for a sidelink data channel or a sidelink reference signal between UE1 and UE2. For example, the sidelink feedback information may include first sidelink feedback information and second sidelink feedback information. The first sidelink feedback information may a feedback for a sidelink data channel or a sidelink reference signal sent by UE1 to UE2, that is, the first sidelink feedback information is sent by UE2 to UE1. The second sidelink feedback information may be a feedback for a sidelink data channel or a sidelink reference signal received by UE1 from UE2, that is, the second sidelink feedback information is obtained by UE1 according to the demodulation result of the received sidelink data channel or the measurement result of the received sidelink reference signal. Furthermore, the UE1 jointly sends the sidelink feedback information to the network device according to the obtained first sidelink feedback information and the second sidelink feedback information.

According to some embodiments, the sidelink feedback information sent by UE1 to the network device may include a feedback for the sidelink data channel or the sidelink reference signal between UE1 and UE2, and may also include a feedback for a sidelink data channel or a sidelink reference signal between UE1 and UE3 (different from UE2).

It should be understood that in embodiments of the present disclosure, UE1 can send multiple types of feedback information to the network device in different time domains. For example, the first sidelink feedback information is sent on the third transmission resource, the second sidelink feedback information is sent on the fourth transmission resource, and the third transmission resource and the fourth transmission resource do not overlap in the time domain. For another example, the first sidelink feedback information is sent on the third transmission resource, the second sidelink feedback information is sent on the fourth transmission resource, the uplink feedback information is sent on the fifth transmission resource, and the third transmission resource, the fourth transmission resource and the fifth transmission resource do not overlap in the time domain.

According to some embodiments, if the sidelink feedback information sent by UE2 is not received by UE1 as the sending end, or UE1 detects that the state of the sidelink feedback information for the sidelink data channel or the sidelink reference signal sent to UE2 is the DTX state, UE1 sets the sidelink feedback information to be sent to the network device as HARQ NACK. For example, UE1 sends PSCCH and PSSCH to UE2. If PSCCH is not detected by UE2, UE2 will not detect PSSCH, and therefore will not send sidelink feedback information to UE1. Then, the sidelink feedback information cannot be detected by UE1, and it can be considered that the state of the sidelink feedback information detected by UE1 at this time is the DTX state. UE1 may set the sidelink feedback information to be sent to the network device as HARQ NACK. After the network device receives the sidelink feedback information, the network device may reallocate sidelink transmission resources.

If the network device allocates transmission resources for UE1 to retransmit the sidelink data while allocating the transmission resources for sidelink data, when the network device receives the HARQ ACK sent by UE1, the network device can reallocate and schedule the retransmission resources that are not used by UE1. If the network device receives the HARQ NACK sent by the UE1, the network device can reallocate the retransmission resources for the sidelink data for the UE1. If UE1 detects that the state of the sidelink feedback information from UE2 is the DTX state, UE1 can send HARQ NACK to the network device, and the network device can reallocate retransmission resources for the sidelink data for UE1.

The state of the uplink feedback information sent by UE1 to the network device is similar to the state of the sidelink feedback information.

According to some embodiments, UE1 may carry the uplink feedback information by the PUCCH or PUSCH channel.

According to some embodiments, UE1 may carry the sidelink feedback information by the PUCCH or PUSCH channel.

Figure 11:
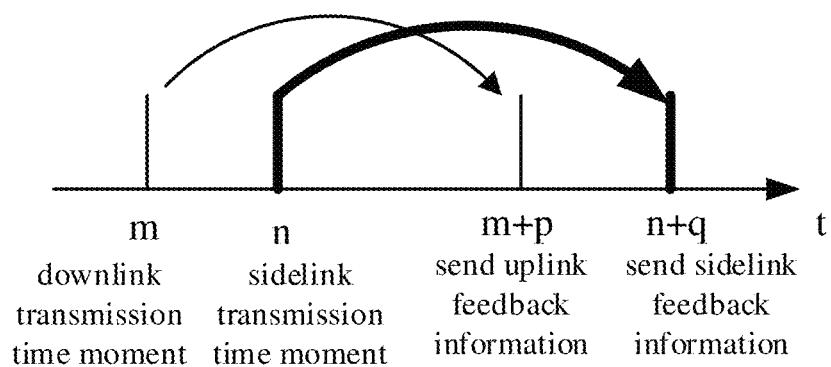
FIG. 11 is a timing sequence diagram showing transmission of uplink feedback information and sidelink feedback information on different time domain resources according to an embodiment of the present disclosure.

Referring to FIG. 11, the network device sends downlink data at a time moment m, and allocates transmission resources at a time moment m+p to send uplink feedback information. The uplink feedback information is feedback information for the downlink data at the time moment m. The network device allocates transmission resources at a time moment n for UE1 to send sidelink data, and allocates transmission resources at a time moment n+q for UE1 to send sidelink feedback information to the network device. The feedback information is feedback information for sidelink data sent by UE1 to UE2.

The time moments m+p and n+q are different time moments, that is, the transmission resources used to send the uplink feedback information and the transmission resources used to send the sidelink feedback information do not overlap in the time domain. Therefore, UE1 only needs to send one type of feedback information at a time moment.

UE1 receives the downlink data at the time moment m, and sends the uplink feedback information for the downlink data at the time moment m+p. UE1 can receive configuration information sent by the network device, and the configuration information includes scheduling information for transmitting sidelink data and resource allocation information for sending the sidelink feedback information to the network device. UE1 sends the sidelink data (PSCCH and/or PSSCH) to UE2 on the transmission resource (that is, time moment n) for the sidelink data allocated by the network device, and sends the sidelink feedback information to the network device at the time moment n+q. The parameters p and q may be pre-configured by a protocol or configured by the network.

It should be understood that the time moment here is a concept with a time span, for example, the time moment m can be regarded as a time unit m.

Figure 12:
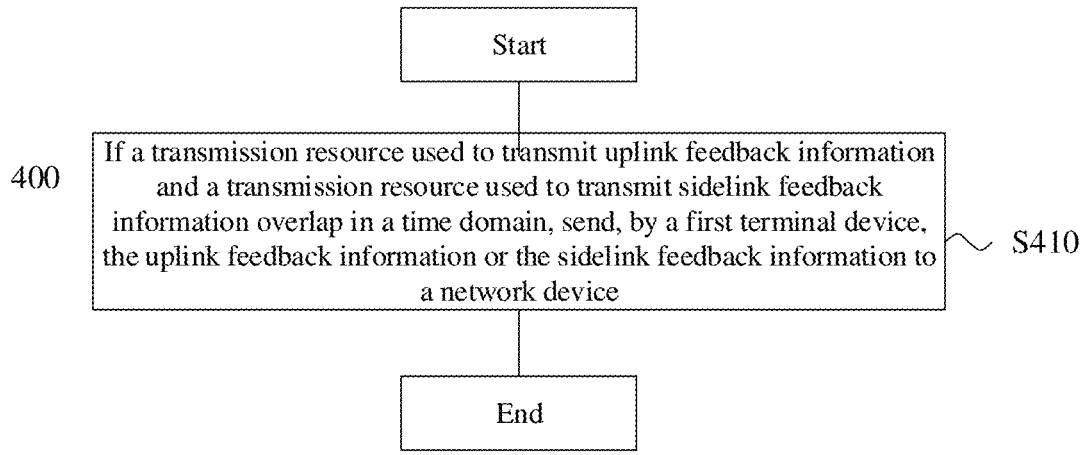
FIG. 12 is a schematic flowchart of an information transmission method according to an embodiment of the present disclosure.

FIG. 12 is a schematic block diagram of an information transmission method 400 according to an embodiment of the present disclosure. As shown in FIG. 12, the method 400 includes some or all of the following contents.

In S410, if a transmission resource used to transmit uplink feedback information and a transmission resource used to transmit sidelink feedback information overlap in a time domain, a first terminal device sends the uplink feedback information or the sidelink feedback information to a network device.

First, it should be noted that the uplink feedback information is a feedback for a downlink data channel or a feedback for downlink reference signal measurement. The sidelink feedback information is a feedback for a sidelink data channel or a feedback for sidelink reference signal measurement. Specifically, the uplink feedback information may be the demodulation result of the downlink data channel or the measurement result of the downlink reference signal, and the sidelink feedback information may be the demodulation result of the sidelink data channel or the measurement result of the sidelink reference signal. For example, the uplink feedback information may include at least one of the following information: HARQ ACK, HARQ NACK, CSI, CQI, PMI, RI, path loss information, beam information, RSRP, RSRQ, RSSI, and CRI, and so on. The sidelink feedback information may include at least one of the following information: sidelink HARQ ACK, sidelink HARQ NACK, sidelink CSI, sidelink CQI, sidelink RSRP, sidelink RSRQ, sidelink RSSI, sidelink path loss information, sidelink beam information, sidelink PMI, sidelink RI, and sidelink CRI, and so on.

In addition, the first terminal device in embodiments of the present disclosure may be a sending end of a sidelink data channel or a sidelink reference signal. For example, the first terminal device is UE1 in FIG. 3. The first terminal device may also be a receiving end of a sidelink data channel or a sidelink reference signal. For example, the first terminal device is UE2 in FIG. 3.

If the first terminal device is the sending end, the sidelink feedback information is sent by the second terminal device to the first terminal device, and the second terminal device is the receiving end of the sidelink data channel or the sidelink reference signal. Specifically, the first terminal device may send the sidelink data channel and/or the sidelink reference signal to the second terminal device, the second terminal device demodulates the sidelink data channel sent by the first terminal device and/or performs measurement on the sidelink reference signal sent by the first terminal device, and the second terminal device can determine the sidelink feedback information according to the demodulation result and/or the measurement result, and then the second terminal device can send the sidelink feedback information to the first terminal device. The first terminal device processes the sidelink feedback information and sends the sidelink feedback information to the network device.

If the first terminal device is the receiving end, the sidelink feedback information is determined by the first terminal device according to the sidelink data channel or the sidelink reference signal sent by the second terminal device, and the second terminal device is the sending end of the sidelink data channel or the sidelink reference signal. Specifically, the first terminal device receives the sidelink data channel and/or the sidelink reference signal sent by the second terminal device, the first terminal device demodulates the sidelink data channel and/or measures the sidelink reference signal, and determines the sidelink feedback information according to the demodulation result and/or the measurement result. The first terminal device may also process the sidelink feedback information and send the sidelink feedback information to the network device.

Specifically, the network device may allocate a first transmission resource to the first terminal device for sending uplink feedback information, and allocate a second transmission resource for sending sidelink feedback information. There may be an overlap between the first transmission resource and the second transmission resource in the time domain, or the first transmission resource and the second transmission resource may be the same transmission resource. The first terminal device decides to send the uplink feedback information or the sidelink feedback information, that is, the first terminal device discards one of the feedback information.

It should be understood that, according to some embodiments of the present disclosure, the first terminal device may choose to send one type of feedback information among multiple types of feedback information to the network device, and is not limited to selecting among the uplink feedback information and the sidelink feedback information. For example, one of the first sidelink feedback information and the second sidelink feedback information mentioned above can be selected, and the other type of sidelink feedback information can be discarded. The transmission resource for transmitting the first sidelink feedback information and the transmission resource for transmitting the second sidelink feedback information overlap in the time domain. For another example, one of the third sidelink feedback information and the fourth sidelink feedback information can be selected to be sent to the network device, and the other type of sidelink feedback information can be discarded. The transmission resource for transmitting the third sidelink feedback information and the transmission resource for transmitting the fourth sidelink feedback information overlap in the time domain.

If the feedback information is data feedback information, the network device may allocate transmission resources for downlink data or sidelink data to the first terminal device and at the same time allocate the transmission resources for the feedback information corresponding to the downlink data or sidelink data to the first terminal device. That is, the first configuration information may be further used to indicate a transmission resource used to transmit downlink data, and the second configuration information may further be used to indicate a transmission resource used to transmit sidelink data. For example, the first terminal device may also receive a first PDCCH sent by the network device. The first PDCCH is used to indicate transmission resources used to transmit PSCCH and/or PSSCH, and the first PDCCH may be further used to indicate transmission resources used to transmit the sidelink feedback information for the PSSCH. The first terminal device can receive a second PDCCH sent by the network device. The second PDCCH is used to indicate transmission resources for the PDSCH, and the second PDCCH can also be used to indicate the transmission resources for the uplink feedback information for the PDSCH. The first PDCCH and the second PDCCH may be different.

According to some embodiments, if the sidelink feedback information sent from the second terminal device is not received by the first terminal device as the sending end, in other words, if the first terminal device detects that a state of sidelink feedback information in response to the sidelink data channel or the sidelink reference signal sent to the second terminal device is a DTX state, the first terminal device sets the sidelink feedback information to be sent to the network device as NACK. For example, the first terminal device sends a PSCCH and a PSSCH to the second terminal device. If the PSCCH is not detected by the second terminal device, the PSSCH will not be detected, and therefore the second terminal device does not send the sidelink feedback information to the first terminal device. Then, the first terminal device cannot detect the sidelink feedback information, and it can be considered that the state of the sidelink feedback information detected by the first terminal device at this time is the DTX state. The first terminal device can set the sidelink feedback information to be sent to the network device as HARQ NACK. After the network device receives the sidelink feedback information, the network device can reallocate sidelink transmission resources.

According to some embodiments, the first terminal device may decide whether to send the uplink feedback information or the sidelink feedback information according to a first criterion. In other words, the first terminal device may decide whether to discard the uplink feedback information or the sidelink feedback information according to the first criterion.

According to some embodiments, the first criterion may be the type of feedback information. For example, the first terminal device only sends the sidelink feedback information, and does not send the uplink feedback information. For another example, the first terminal device only sends the data feedback information, but does not send the channel feedback information. If the uplink feedback information includes the data feedback information and the sidelink feedback information includes the channel feedback information, then the first terminal device sends the uplink feedback information, but does not send the sidelink feedback information.

According to some embodiments, the first criterion may be the priorities of the uplink feedback information and the sidelink feedback information, or the priorities of various types of feedback information. For example, the first terminal device may send feedback information with the highest priority to the network device. The sidelink transmission in the Internet of Vehicles is usually a safety-related service, and thus the sidelink has a higher priority. When the terminal can only send one type of information, the sidelink feedback information can be sent preferentially.

According to some embodiments, the first criterion may be a relationship between values of a first attribute of sidelink data corresponding to the sidelink feedback information and a first threshold, or a relationship between values of a first attribute of downlink data corresponding to the uplink feedback information and a first threshold, or a relationship between values of a first attribute of sidelink data corresponding to the sidelink feedback information and a first attribute of downlink data corresponding to the uplink feedback information. The first attribute may be priority information, time delay information, reliability information, transmission rate information, or communication distance information. The first threshold may be a priority threshold, a delay threshold, a reliability threshold, a transmission rate threshold, or a communication distance threshold. For example, the first attribute is priority information, the first threshold is a priority threshold, and the first terminal device compares the priority of the sidelink data with the priority threshold; if the value of the priority of the sidelink data is less than or equal to the priority threshold, then the first terminal device sends the sidelink feedback information (it can be set that the lower the priority value, the higher the priority is. For example, the range of the priority value is [0,7], where 0 means the highest priority, and 7 means the lowest priority); otherwise, the first terminal device sends the uplink feedback information. For another example, the first attribute is delay information, and the first threshold is a delay threshold. The first terminal device may compare the delay of the sidelink data with the delay threshold; if the value of the delay information is greater than or equal to the delay threshold, the first terminal device sends the uplink feedback information; otherwise, the first terminal device sends the sidelink feedback information.

According to some embodiments, the first criterion may be a time order in which the first terminal device receives the downlink data corresponding to the uplink feedback information and the sidelink feedback information. For example, if the first terminal device first receives the downlink data, the first terminal device sends the uplink feedback information and does not send the sidelink feedback information; if the first terminal device receives the sidelink feedback information first, the first terminal device sends the sidelink feedback information first, and does not send the uplink Feedback.

According to some embodiments, the first terminal device may carry the uplink feedback information by the PUCCH or PUSCH channel.

According to some embodiments, the first terminal device may carry the sidelink feedback information by the PUCCH or PUSCH channel.

Figure 13:
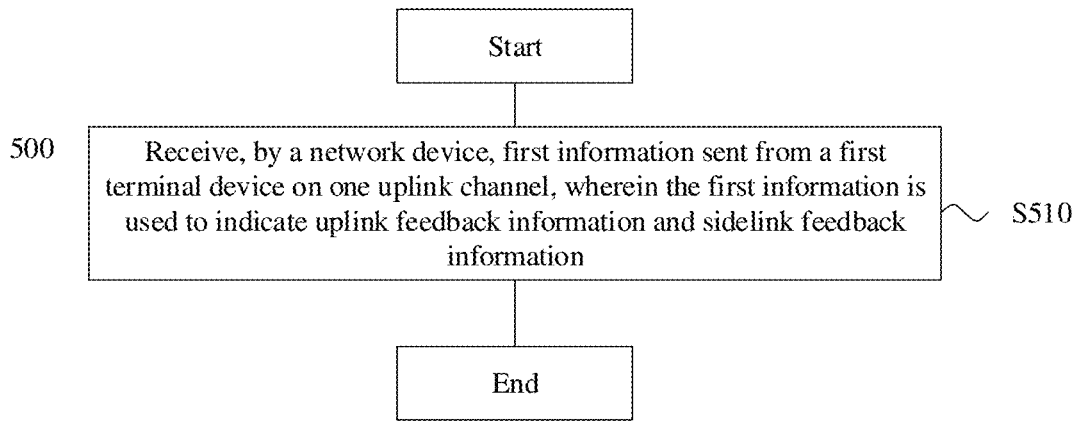
FIG. 13 is a schematic flowchart of an information transmission method according to an embodiment of the present disclosure.

FIG. 13 is a schematic block diagram of an information transmission method 500 according to an embodiment of the present disclosure. As shown in FIG. 13, the method 500 includes some or all of the following contents.

In S510, a network device receives first information sent from a first terminal device on one uplink channel. The first information is used to indicate uplink feedback information and sidelink feedback information.

According to some embodiments of the present disclosure, the uplink channel is a Physical Uplink Control Channel (PUCCH); the first information is generated by performing a bit concatenation operation on the uplink feedback information that has undergone a bit AND operation and the sidelink feedback information that has undergone a bit AND operation; or the first information is generated by performing a bit concatenation operation on the sidelink feedback information and the uplink feedback information that has undergone a bit AND operation; or the first information is generated by performing a bit concatenation operation on the uplink feedback information and the sidelink feedback information that has undergone a bit AND operation to generate the first information, or the first information is generated by performing a bit AND operation on the uplink feedback information and the sidelink feedback information; or the first information is generated by performing a bit concatenation operation on the uplink feedback information and the sidelink feedback information.

According to some embodiments of the present disclosure, the uplink channel is a Physical Uplink Shared Channel (PUSCH), the first information occupies a first transmission resource on the PUSCH, and the first transmission resource is determined by puncturing or rate matching.

According to some embodiments of the present disclosure, the first information includes data feedback information; if a bit sequence of the data feedback information is less than or equal to K bits, a resource occupied by the data feedback information is determined by puncturing; if the bit sequence of the data feedback information is greater than K bits, the resource occupied by the data feedback information is determined by rate matching, wherein K is a positive integer, and the data feedback information includes Hybrid Automatic Repeat reQuest (HARQ) acknowledgement (ACK)/negative acknowledgement (NACK) and/or sidelink HARQ ACK/NACK.

According to some embodiments of the present disclosure, the data feedback information includes the HARQ ACK/NACK and the sidelink HARQ ACK/NACK, and the bit sequence of the data feedback information is obtained by performing a bit concatenation operation or a bit AND operation on the HARQ ACK/NACK and the sidelink HARQ ACK/NACK.

According to some embodiments of the present disclosure, the data feedback information includes the HARQ ACK/NACK and the sidelink HARQ ACK/NACK, the HARQ ACK/NACK occupies a second transmission on the PUSCH, the sidelink HARQ ACK/NACK occupies a third transmission resource on the PUSCH, and the second transmission resource and the third transmission resource are orthogonal resources.

According to some embodiments of the present disclosure, the first information includes channel feedback information, and a resource occupied by the channel feedback information is determined by rate matching, wherein the channel feedback information includes at least one of the following information: Channel State Information (CSI), Channel Quality Indicator (CQI), Precoding Matrix Indicator (PMI), Rank Indicator (RI), beam information, Reference Signal Received Power (RSRP), Reference Signal Received Quality (RSRQ), Received Signal Strength Indicator (RSSI), path loss information, CSI-Reference Signal Resource Indicator (CRI), sidelink CSI, sidelink CQI, sidelink PMI, sidelink RI, sidelink beam information, sidelink RSRP, sidelink RSRQ, sidelink RSSI, sidelink path loss information, and sidelink CRI.

According to some embodiments of the present disclosure, the first information includes the uplink feedback information and the sidelink feedback information, and the uplink feedback information and the sidelink feedback information are transmitted through orthogonal resources on the PUSCH.

According to some embodiments of the present disclosure, the first information includes data feedback information and channel feedback information, and the data feedback information and the channel feedback information are transmitted through orthogonal resources on the PUSCH.

According to some embodiments of the present disclosure, the method further includes sending, by the network device, first configuration information to the first terminal device, wherein the first configuration information is used to indicate a fourth transmission resource used to transmit the uplink feedback information; sending, by the network device, second configuration information to the first terminal device, wherein the second configuration information is used to indicate a fifth transmission resource used to transmit the sidelink feedback information; and receiving, by the network device, the first information carried by the one uplink channel on the fourth transmission resource or the fifth transmission resource.

According to some embodiments of the present disclosure, the second configuration information is further used to indicate a transmission resource for transmitting sidelink data corresponding to the sidelink feedback information.

According to some embodiments of the present disclosure, the method further includes sending, by the network device, third configuration information to the first terminal device, wherein the third configuration information is used to indicate a sixth transmission resource used to transmit downlink data corresponding to the uplink feedback information or a seventh transmission resource used to transmit sidelink data corresponding to the sidelink feedback information.

According to some embodiments of the present disclosure, the uplink feedback information includes at least one of the following information: Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), Rank Indicator (RI), path loss information, beam information, Reference Signal Received Power (RSRP), Reference Signal Received Quality (RSRQ), Received Signal Strength Indicator (RSSI), and CRI; and/or wherein the sidelink feedback information includes at least one of the following information: sidelink HARQ ACK, sidelink HARQ NACK, sidelink CSI, sidelink CQI, sidelink beam information, sidelink RSRP, sidelink RSRQ, sidelink RSSI, sidelink path loss information, sidelink PMI, and sidelink RI.

According to some embodiments of the present disclosure, the uplink channel is a Physical Uplink Shared Channel (PUSCH), there is no uplink data transmission on the PUSCH, and the first information occupies all resources on the PUSCH except a resource for a Demodulation Reference Signal, or the first information occupies all resources on the PUSCH except a time domain symbol where the DMRS is located.

Figure 14:
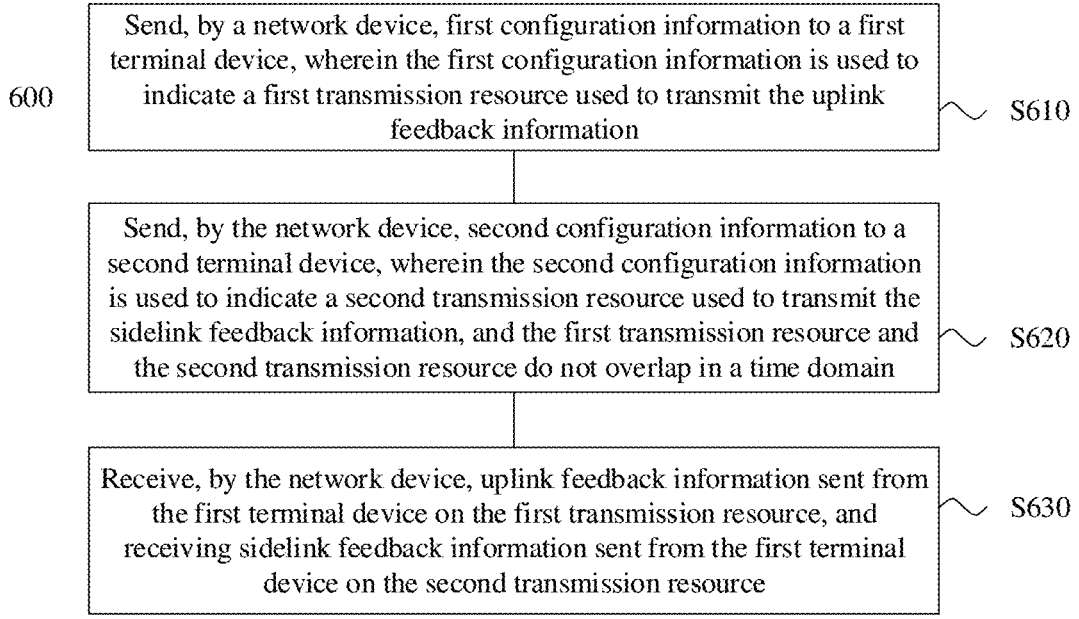
FIG. 14 is a schematic flowchart of an information transmission method according to an embodiment of the present disclosure.

FIG. 14 is a schematic block diagram of an information transmission method 600 according to an embodiment of this disclosure. As shown in FIG. 14, the method 600 includes some or all of the following contents.

In S610, a network device sends first configuration information to a first terminal device. The first configuration information is used to indicate a first transmission resource used to transmit the uplink feedback information.

In S620, the network device sends second configuration information to a second terminal device. The second configuration information is used to indicate a second transmission resource used to transmit the sidelink feedback information, and the first transmission resource and the second transmission resource do not overlap in a time domain.

In S630, the network device receives uplink feedback information sent from the first terminal device on the first transmission resource, and receives sidelink feedback information sent from the first terminal device on the second transmission resource.

According to some embodiments of the present disclosure, the second configuration information is further used to indicate a transmission resource for transmitting sidelink data corresponding to the sidelink feedback information.

According to some embodiments of the present disclosure, the first transmission resource is a Physical Uplink Control Channel (PUCCH) or a Physical Uplink Shared Channel (PUSCH), and/or the second transmission resource is a PUCCH or PUSCH.

According to some embodiments of the present disclosure, the uplink feedback information includes at least one of the following information: Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), Rank Indicator (RI), path loss information, beam information, Reference Signal Received Power (RSRP), Reference Signal Received Quality (RSRQ), Received Signal Strength Indicator (RSSI), and CSI-Reference Signal Resource Indicator (CRI); and/or the sidelink feedback information includes at least one of the following information: sidelink HARQ ACK, sidelink HARQ NACK, sidelink CSI, sidelink CQI, sidelink beam information, sidelink RSRP, sidelink RSRQ, sidelink RSSI, sidelink path loss information, sidelink PMI, sidelink RI, and sidelink CRI.

It should be understood that the interactions between the network device and the terminal devices and related characteristics and functions described in the network device embodiments correspond to related characteristics and functions described in the terminal device embodiments. That is to say, what message the network device sends to the terminal device, and the terminal device receives the corresponding message from the network device.

It should also be understood that, in embodiments of the present disclosure, the sequence numbers of the foregoing processes does not mean the order of the processes. The order in which the processes can be performed should be determined by their functions and internal logic, and should not be considered as constituting any limitation on implementations of the present disclosure.

The information transmission methods according to embodiment of the present disclosure are described in detail above, and information transmission devices according to embodiments of the present disclosure will be described below with reference to FIG. 15 to FIG. 21. The technical features described in the method embodiments are applicable to the following device embodiments.

Figure 15:
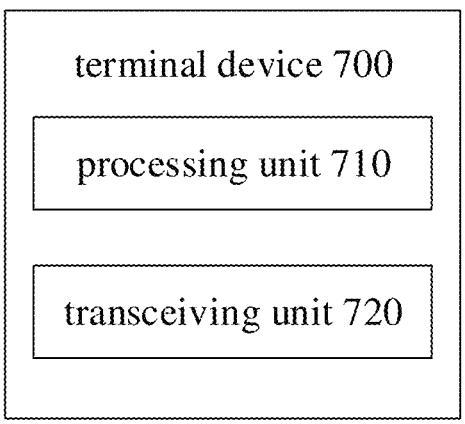
FIG. 15 is a schematic block diagram of a terminal device according to an embodiment of the present disclosure.

FIG. 15 shows a schematic block diagram of a terminal device 700 according to an embodiment of the present disclosure. As shown in FIG. 15, the terminal device 700 includes a processing unit 710 and a transceiving unit 720.

The processing unit 710 is configured to obtain uplink feedback information and sidelink feedback information.

The transceiving unit 720 is configured to send first information to a network device on one uplink channel, wherein the first information is used to indicate the uplink feedback information and the sidelink feedback information.

According to some embodiments of the present disclosure, the uplink channel is a Physical Uplink Control Channel (PUCCH), and the processing unit is further configured to perform a bit concatenation operation on the uplink feedback information that has undergone a bit AND operation and the sidelink feedback information that has undergone a bit AND operation to generate the first information; or perform a bit concatenation operation on the sidelink feedback information and the uplink feedback information that has undergone a bit AND operation to generate the first information; or perform a bit concatenation operation on the uplink feedback information and the sidelink feedback information that has undergone a bit AND operation to generate the first information, or perform a bit AND operation on the uplink feedback information and the sidelink feedback information to generate the first information; or perform a bit concatenation operation on the uplink feedback information and the sidelink feedback information to generate the first information.

According to some embodiments of the present disclosure, the uplink channel is a Physical Uplink Shared Channel (PUSCH), the first information occupies a first transmission resource on the PUSCH, and the first transmission resource is determined by puncturing or rate matching.

According to some embodiments of the present disclosure, the first information includes data feedback information; if a bit sequence of the data feedback information is less than or equal to K bits, a resource occupied by the data feedback information is determined by puncturing; if the bit sequence of the data feedback information is greater than K bits, the resource occupied by the data feedback information is determined by rate matching; wherein K is a positive integer, and the data feedback information includes Hybrid Automatic Repeat reQuest (HARQ) acknowledgement (ACK)/negative acknowledgement (NACK) and/or sidelink HARQ ACK/NACK.

According to some embodiments of the present disclosure, the data feedback information includes the HARQ ACK/NACK and the sidelink HARQ ACK/NACK, and the bit sequence of the data feedback information is obtained by performing a bit concatenation operation or a bit AND operation on the HARQ ACK/NACK and the sidelink HARQ ACK/NACK.

According to some embodiments of the present disclosure, the data feedback information includes the HARQ ACK/NACK and the sidelink HARQ ACK/NACK, the HARQ ACK/NACK occupies a second transmission on the PUSCH, the sidelink HARQ ACK/NACK occupies a third transmission resource on the PUSCH, and the second transmission resource and the third transmission resource are orthogonal resources.

According to some embodiments of the present disclosure, the first information includes channel feedback information, and a resource occupied by the channel feedback information is determined by rate matching; wherein the channel feedback information includes at least one of the following information: Channel State Information (CSI), Channel Quality Indicator (CQI), Precoding Matrix Indicator (PMI), Rank Indicator (RI), beam information, Reference Signal Received Power (RSRP), Reference Signal Received Quality (RSRQ), Received Signal Strength Indicator (RSSI), path loss information, CSI-Reference Signal Resource Indicator (CRI), sidelink CSI, sidelink CQI, sidelink PMI, sidelink RI, sidelink beam information, sidelink RSRP, sidelink RSRQ, sidelink RSSI, sidelink path loss information, and sidelink CRI.

According to some embodiments of the present disclosure, the first information includes the uplink feedback information and the sidelink feedback information, and the uplink feedback information and the sidelink feedback information are transmitted through orthogonal resources on the PUSCH.

According to some embodiments of the present disclosure, the first information includes data feedback information and channel feedback information, and the data feedback information and the channel feedback information are transmitted through orthogonal resources on the PUSCH.

According to some embodiments of the present disclosure, the processing unit is further configured to determine a transmission resource for the uplink channel.

According to some embodiments of the present disclosure, the transceiving unit is further configured to obtain first configuration information, wherein the first configuration information is used to indicate a fourth transmission resource used to transmit the uplink feedback information; and obtain second configuration information, wherein the second configuration information is used to indicate a fifth transmission resource used to transmit the sidelink feedback information, wherein the processing unit is configured to determine the fourth transmission resource or the fifth transmission resource as the transmission resource for the uplink channel.

According to some embodiments of the present disclosure, the processing unit is configured to determine the fourth transmission resource or the fifth transmission resource as the transmission for the uplink channel according to a sequential order of the fourth transmission resource and the fifth transmission resource in a time domain.

According to some embodiments of the present disclosure, the transceiving unit is further configured to obtain third configuration information, wherein the third configuration information is used to indicate a sixth transmission resource used to transmit downlink data corresponding to the uplink feedback information or a seventh transmission resource used to transmit sidelink data corresponding to the sidelink feedback information, wherein the processing unit is configured to determine the transmission resource for the uplink channel according to the sixth transmission resource or the seventh transmission resource.

According to some embodiments of the present disclosure, the second configuration information is further used to indicate a transmission resource for transmitting sidelink data corresponding to the sidelink feedback information.

According to some embodiments of the present disclosure, the processing unit is configured to receive the sidelink feedback information sent from a second terminal device.

According to some embodiments of the present disclosure, the processing unit is configured to, if the sidelink feedback information sent from a second terminal device is not received by the first terminal device, or if the first terminal device detects that a state of sidelink feedback information in response to sidelink data sent to the second terminal device is a discontinuous transmission (DTX) state, determine the sidelink feedback information indicated by the first information as a negative acknowledgement (NACK).

According to some embodiments of the present disclosure, the processing unit is configured to receive a sidelink reference signal and/or sidelink data sent from a second terminal device; and determine the sidelink feedback information according to a measurement result of the sidelink reference signal and/or a demodulation result of the sidelink data.

According to some embodiments of the present disclosure, the transceiving unit is further configured to receive a first Physical Downlink Control Channel (PDCCH), wherein the first PDCCH is used to indicate a transmission resource for sidelink data corresponding to the sidelink feedback information; and receive a second PDCCH, wherein the second PDCCH is used to indicate a transmission resource for downlink data corresponding to the uplink feedback information, and the first PDCCH is different from the second PDCCH.

According to some embodiments of the present disclosure, the uplink feedback information includes at least one of the following information: Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), Rank Indicator (RI), path loss information, beam information, Reference Signal Received Power (RSRP), Reference Signal Received Quality (RSRQ), Received Signal Strength Indicator (RSSI), and CSI-Reference Signal Resource Indicator (CRI); and/or wherein the sidelink feedback information includes at least one of the following information: sidelink HARQ ACK, sidelink HARQ NACK, sidelink CSI, sidelink CQI, sidelink beam information, sidelink RSRP, sidelink RSRQ, sidelink RSSI, sidelink path loss information, sidelink PMI, sidelink RI, and sidelink CRI.

According to some embodiments of the present disclosure, the uplink channel is a Physical Uplink Shared Channel (PUSCH), there is no uplink data transmission on the PUSCH, and the first information occupies all resources on the PUSCH except a resource for a Demodulation Reference Signal, or the first information occupies all resources on the PUSCH except a time domain symbol where the DMRS is located.

It should be understood that the terminal device 700 according to embodiments correspond to the terminal device described in the method embodiments, and units in the terminal device 700 are used to implement the above and other operations and/or functions implemented by the terminal device in the method in FIG. 4. For the sake of brevity, details are not described herein again.

Figure 16:
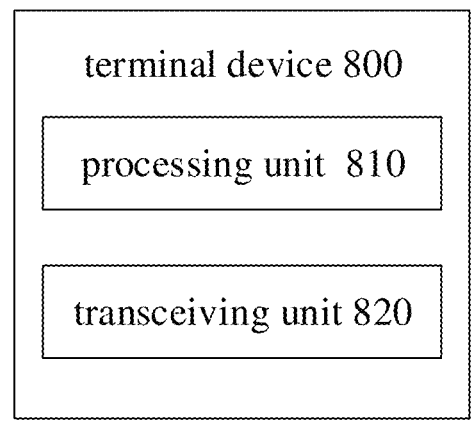
FIG. 16 is another schematic block diagram of a terminal device according to an embodiment of the present disclosure.

FIG. 16 shows a schematic block diagram of a terminal device 800 according to an embodiment of the present disclosure. As shown in FIG. 16, the terminal device 800 includes a processing unit 810 and a transceiving unit 820.

The processing unit 810 is configured to determine uplink feedback information and sidelink feedback information to be sent to a network device.

The transceiving unit 820 is configured to send the uplink feedback information and the sidelink feedback information to the network device on different time domain resources.

According to some embodiments of the present disclosure, the transceiving unit is further configured to obtain first configuration information, wherein the first configuration information is used to indicate a first transmission resource used to transmit the uplink feedback information; and obtain second configuration information, wherein the second configuration information is used to indicate a second transmission resource used to transmit the sidelink feedback information, and the first transmission resource and the second transmission resource do not overlap in a time domain; wherein the transceiving unit is further configured to send the uplink feedback information to the network device on the first transmission resource, and sending the sidelink feedback information to the network device on the second transmission resource.

According to some embodiments of the present disclosure, the second configuration information is further used to indicate a transmission resource for transmitting sidelink data corresponding to the sidelink feedback information.

According to some embodiments of the present disclosure, the processing unit is configured to receive the sidelink feedback information sent from a second terminal device.

According to some embodiments of the present disclosure, the processing unit is configured to receive a sidelink reference signal and/or sidelink data sent from a second terminal device; and determine the sidelink feedback information according to a measurement result of the sidelink reference signal and/or a demodulation result of the sidelink data.

According to some embodiments of the present disclosure, the processing unit is configured to, if the sidelink feedback information sent from a second terminal device is not received by the first terminal device, or if the first terminal device detects that a state of sidelink feedback information in response to sidelink data sent to the second terminal device is a discontinuous transmission (DTX) state, determine the sidelink feedback information to be sent to the network as a negative acknowledgement (NACK).

According to some embodiments of the present disclosure, the first transmission resource is a Physical Uplink Control Channel (PUCCH) or a Physical Uplink Shared Channel (PUSCH), and/or the second transmission resource is a PUCCH or PUSCH.

According to some embodiments of the present disclosure, the uplink feedback information includes at least one of the following information: Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), Rank Indicator (RI), path loss information, beam information, Reference Signal Received Power (RSRP), Reference Signal Received Quality (RSRQ), Received Signal Strength Indicator (RSSI), and CSI-Reference Signal Resource Indicator (CRI); and/or wherein the sidelink feedback information includes at least one of the following information: sidelink HARQ ACK, sidelink HARQ NACK, sidelink CSI, sidelink CQI, sidelink beam information, sidelink RSRP, sidelink RSRQ, sidelink RSSI, sidelink path loss information, sidelink PMI, sidelink RI, and sidelink CRI.

It should be understood that the terminal device 800 according to embodiments correspond to the terminal device described in the method embodiments, and units in the terminal device 800 are used to implement the above and other operations and/or functions implemented by the terminal device in the method in FIG. 9 and FIG. 10. For the sake of brevity, details are not described herein again.

Figure 17:
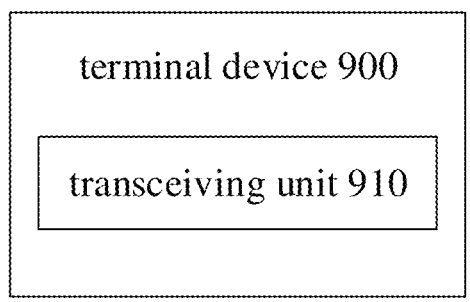
FIG. 17 is another schematic block diagram of a terminal device according to an embodiment of the present disclosure.

FIG. 17 shows a schematic block diagram of a terminal device 900 according to an embodiment of the present disclosure. As shown in FIG. 17, the terminal device 900 includes a transceiving unit 910.

The transceiving unit 910 is configured to, if a transmission resource used to transmit uplink feedback information and a transmission resource used to transmit sidelink feedback information overlap in a time domain, send the uplink feedback information or the sidelink feedback information to a network device.

According to some embodiments of the present disclosure, the transceiving unit is further configured to obtain first configuration information, wherein the first configuration information is used to indicate a first transmission resource used to transmit the uplink feedback information; and obtain second configuration information, wherein the second configuration information is used to indicate a second transmission resource used to transmit the sidelink feedback information, and the first transmission resource and the second transmission resource overlap in the time domain; wherein the transceiving unit is configured to send the uplink feedback information on the first transmission resource or sending the sidelink feedback information on the second transmission resource.

According to some embodiments of the present disclosure, the second configuration information is further used to indicate a transmission resource for transmitting sidelink data corresponding to the sidelink feedback information.

According to some embodiments of the present disclosure, the transceiving unit is further configured to receive the sidelink feedback information sent from a second terminal device.

According to some embodiments of the present disclosure, the transceiving unit is further configured to receive a sidelink reference signal and/or sidelink data sent from a second terminal device; and wherein the terminal device further includes a processing unit configured to determine the sidelink feedback information according to a measurement result of the sidelink reference signal and/or a demodulation result of the sidelink data.

According to some embodiments of the present disclosure, the terminal device further includes a processing unit configured to, if the sidelink feedback information sent from a second terminal device is not received by the first terminal device, or if the first terminal device detects that a state of sidelink feedback information in response to sidelink data sent to the second terminal device is a discontinuous transmission (DTX) state, determine the sidelink feedback information to be sent to the network device as a negative acknowledgement (NACK).

According to some embodiments of the present disclosure, the transceiving unit is configured to send the uplink feedback information or the sidelink feedback information to the network device according to a first criterion.

According to some embodiments of the present disclosure, the first criterion includes at least one of the following: a feedback information type, a relationship between values of a first attribute of sidelink data corresponding to the sidelink feedback information and a first threshold, and a time order in which the first terminal device receives downlink data corresponding to the uplink feedback information and the sidelink feedback information.

According to some embodiments of the present disclosure, the first attribute includes at least one of the following information: priority information, delay information, reliability information, transmission rate information, and communication distance information.

According to some embodiments of the present disclosure, the first threshold is predefined by a protocol, or the first threshold is configured by a network.

According to some embodiments of the present disclosure, the first attribute includes the priority information; wherein the transceiving unit is configured to if a value of the priority information is greater than or greater than or equal to the first threshold, send the uplink feedback information to the network device; or if the value of the priority information is less than or less than or equal to the first threshold, send the sidelink feedback information to the network device.

According to some embodiments of the present disclosure, the first attribute includes the delay information; wherein the transceiving unit is configured to if a value of the delay information is greater than or greater than or equal to the first threshold, send the uplink feedback information to the network device; or if the value of the delay information is less than or less than or equal to the first threshold, send the sidelink feedback information to the network device.

According to some embodiments of the present disclosure, the first criterion includes the time order in which the first terminal device receives downlink data corresponding to the uplink feedback information and the sidelink feedback information; wherein the transceiving unit is configured to, if the first terminal device first receives the downlink data, send the uplink feedback information to the network device; or if the first terminal device first receives the sidelink feedback information, send the sidelink feedback information to the network device.

According to some embodiments of the present disclosure, the first transmission resource is a Physical Uplink Control Channel (PUCCH) or a Physical Uplink Shared Channel (PUSCH), and/or the second transmission resource is a PUCCH or PUSCH.

According to some embodiments of the present disclosure, the uplink feedback information includes at least one of the following information: Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), Rank Indicator (RI), path loss information, beam information, Reference Signal Received Power (RSRP), Reference Signal Received Quality (RSRQ), Received Signal Strength Indicator (RSSI), and CSI-Reference Signal Resource Indicator (CRI); and/or wherein the sidelink feedback information includes at least one of the following information: sidelink HARQ ACK, sidelink HARQ NACK, sidelink CSI, sidelink CQI, sidelink beam information, sidelink RSRP, sidelink RSRQ, sidelink RSSI, sidelink path loss information, sidelink PMI, sidelink RI, and sidelink CRI.

It should be understood that the terminal device 900 according to embodiments correspond to the terminal device described in the method embodiments, and units in the terminal device 900 are used to implement the above and other operations and/or functions implemented by the terminal device in the method in FIG. 12. For the sake of brevity, details are not described herein again.

Figure 18:
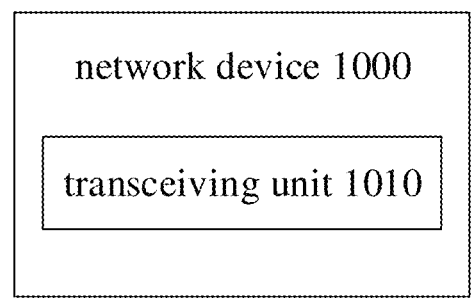
FIG. 18 is a schematic block diagram of a network device according to an embodiment of the present disclosure.

FIG. 18 shows a schematic block diagram of a network device 1000 according to an embodiment of the present disclosure. As shown in FIG. 18, the network device 1000 includes a transceiving unit 1010.

The transceiving unit 1010 is configured to receive first information sent from a first terminal device on one uplink channel, wherein the first information is used to indicate uplink feedback information and sidelink feedback information.

According to some embodiments of the present disclosure, the uplink channel is a Physical Uplink Control Channel (PUCCH); wherein the first information is generated by performing a bit concatenation operation on the uplink feedback information that has undergone a bit AND operation and the sidelink feedback information that has undergone a bit AND operation; or wherein the first information is generated by performing a bit concatenation operation on the sidelink feedback information and the uplink feedback information that has undergone a bit AND operation; or wherein the first information is generated by performing a bit concatenation operation on the uplink feedback information and the sidelink feedback information that has undergone a bit AND operation to generate the first information, or wherein the first information is generated by performing a bit AND operation on the uplink feedback information and the sidelink feedback information; or wherein the first information is generated by performing a bit concatenation operation on the uplink feedback information and the sidelink feedback information.

According to some embodiments of the present disclosure, the uplink channel is a Physical Uplink Shared Channel (PUSCH), the first information occupies a first transmission resource on the PUSCH, and the first transmission resource is determined by puncturing or rate matching.

According to some embodiments of the present disclosure, the first information includes data feedback information; if a bit sequence of the data feedback information is less than or equal to K bits, a resource occupied by the data feedback information is determined by puncturing; if the bit sequence of the data feedback information is greater than K bits, the resource occupied by the data feedback information is determined by rate matching; wherein K is a positive integer, and the data feedback information includes Hybrid Automatic Repeat reQuest (HARQ) acknowledgement (ACK)/negative acknowledgement (NACK) and/or sidelink HARQ ACK/NACK.

According to some embodiments of the present disclosure, the data feedback information includes the HARQ ACK/NACK and the sidelink HARQ ACK/NACK, and the bit sequence of the data feedback information is obtained by performing a bit concatenation operation or a bit AND operation on the HARQ ACK/NACK and the sidelink HARQ ACK/NACK.

According to some embodiments of the present disclosure, the data feedback information includes the HARQ ACK/NACK and the sidelink HARQ ACK/NACK, the HARQ ACK/NACK occupies a second transmission on the PUSCH, the sidelink HARQ ACK/NACK occupies a third transmission resource on the PUSCH, and the second transmission resource and the third transmission resource are orthogonal resources.

According to some embodiments of the present disclosure, the first information includes channel feedback information, and a resource occupied by the channel feedback information is determined by rate matching; wherein the channel feedback information includes at least one of the following information: Channel State Information (CSI), Channel Quality Indicator (CQI), Precoding Matrix Indicator (PMI), Rank Indicator (RI), beam information, Reference Signal Received Power (RSRP), Reference Signal Received Quality (RSRQ), Received Signal Strength Indicator (RSSI), path loss information, CSI-Reference Signal Resource Indicator (CRI), sidelink CSI, sidelink CQI, sidelink PMI, sidelink RI, sidelink beam information, sidelink RSRP, sidelink RSRQ, sidelink RSSI, sidelink path loss information, and sidelink CRI.

According to some embodiments of the present disclosure, the first information includes the uplink feedback information and the sidelink feedback information, and the uplink feedback information and the sidelink feedback information are transmitted through orthogonal resources on the PUSCH.

According to some embodiments of the present disclosure, the first information includes data feedback information and channel feedback information, and the data feedback information and the channel feedback information are transmitted through orthogonal resources on the PUSCH.

According to some embodiments of the present disclosure, the transceiving unit is further configured to send first configuration information to the first terminal device, wherein the first configuration information is used to indicate a fourth transmission resource used to transmit the uplink feedback information; send second configuration information to the first terminal device, wherein the second configuration information is used to indicate a fifth transmission resource used to transmit the sidelink feedback information; and receive the first information carried by the one uplink channel on the fourth transmission resource or the fifth transmission resource.

According to some embodiments of the present disclosure, the second configuration information is further used to indicate a transmission resource for transmitting sidelink data corresponding to the sidelink feedback information.

According to some embodiments of the present disclosure, the transceiving unit is further configured to send third configuration information to the first terminal device, wherein the third configuration information is used to indicate a sixth transmission resource used to transmit downlink data corresponding to the uplink feedback information or a seventh transmission resource used to transmit sidelink data corresponding to the sidelink feedback information.

According to some embodiments of the present disclosure, the uplink feedback information includes at least one of the following information: Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), Rank Indicator (RI), path loss information, beam information, Reference Signal Received Power (RSRP), Reference Signal Received Quality (RSRQ), Received Signal Strength Indicator (RSSI) and CSI-Reference Signal Resource Indicator (CRI); and/or wherein the sidelink feedback information includes at least one of the following information: sidelink HARQ ACK, sidelink HARQ NACK, sidelink CSI, sidelink CQI, sidelink beam information, sidelink RSRP, sidelink RSRQ, sidelink RSSI, sidelink path loss information, sidelink PMI, sidelink RI and sidelink CRI.

According to some embodiments of the present disclosure, the uplink channel is a Physical Uplink Shared Channel (PUSCH), there is no uplink data transmission on the PUSCH, and the first information occupies all resources on the PUSCH except a resource for a Demodulation Reference Signal, or the first information occupies all resources on the PUSCH except a time domain symbol where the DMRS is located.

It should be understood that the network device 1000 according to embodiments correspond to the network device described in the method embodiments, and units in the network device 1000 are used to implement the above and other operations and/or functions implemented by the network device in the method in FIG. 13. For the sake of brevity, details are not described herein again.

Figure 19:
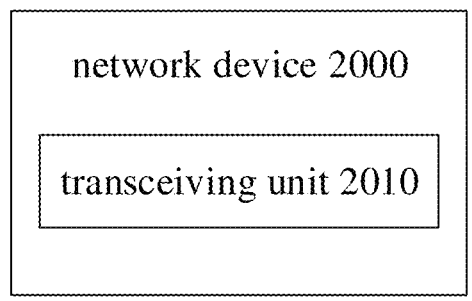
FIG. 19 is another schematic block diagram of a network device according to an embodiment of the present disclosure.

FIG. 19 shows a schematic block diagram of a network device 2000 according to an embodiment of the present disclosure. As shown in FIG. 19, the network device 2000 includes a transceiving unit 2010.

The transceiving unit 2010 is configured to send first configuration information to a first terminal device, wherein the first configuration information is used to indicate a first transmission resource used to transmit the uplink feedback information; and send second configuration information to a second terminal device, wherein the second configuration information is used to indicate a second transmission resource used to transmit the sidelink feedback information, and the first transmission resource and the second transmission resource do not overlap in a time domain; and receive uplink feedback information sent from the first terminal device on the first transmission resource, and receive sidelink feedback information sent from the first terminal device on the second transmission resource.

According to some embodiments of the present disclosure, the second configuration information is further used to indicate a transmission resource for transmitting sidelink data corresponding to the sidelink feedback information.

According to some embodiments of the present disclosure, the first transmission resource is a Physical Uplink Control Channel (PUCCH) or a Physical Uplink Shared Channel (PUSCH), and/or the second transmission resource is a PUCCH or PUSCH.

According to some embodiments of the present disclosure, the uplink feedback information includes at least one of the following information: Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), Rank Indicator (RI), path loss information, beam information, Reference Signal Received Power (RSRP), Reference Signal Received Quality (RSRQ), Received Signal Strength Indicator (RSSI), and CSI-Reference Signal Resource Indicator (CRI); and/or wherein the sidelink feedback information includes at least one of the following information: sidelink HARQ ACK, sidelink HARQ NACK, sidelink CSI, sidelink CQI, sidelink beam information, sidelink RSRP, sidelink RSRQ, sidelink RSSI, sidelink path loss information, sidelink PMI, sidelink RI, and sidelink CRI.

It should be understood that the network device 2000 according to embodiments correspond to the network device described in the method embodiments, and units in the network device 2000 are used to implement the above and other operations and/or functions implemented by the network device in the method in FIG. 14. For the sake of brevity, details are not described herein again.

Figure 20:
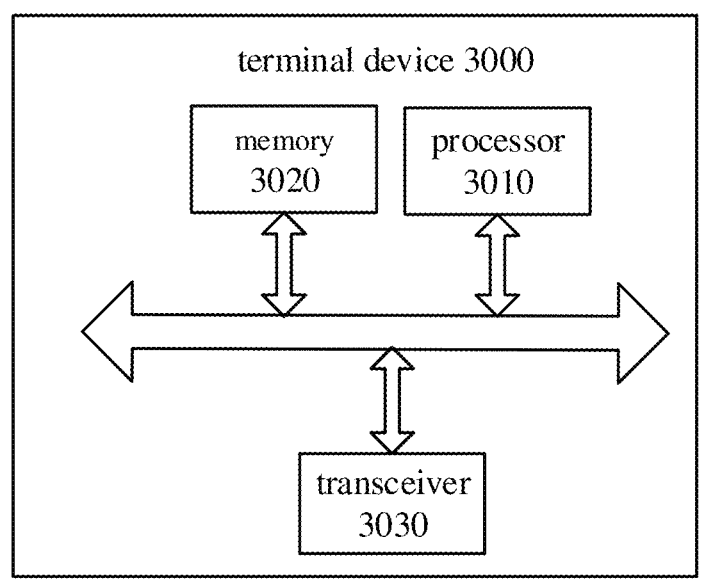
FIG. 20 is another schematic block diagram of a terminal device according to an embodiment of the present disclosure.

As shown in FIG. 20, an embodiment of the present disclosure further provides a terminal device 3000. The terminal device 3000 may be the terminal device 700 in FIG. 15, which can be used to perform the steps of the terminal device corresponding to the method 100 in FIG. 4. The terminal device 3000 may also be the terminal device 800 in FIG. 16, which can be used to perform the steps of the terminal device corresponding to methods 200 and 300 in FIG. 9 and FIG. 10. The terminal device 3000 may also be the terminal device 900 in FIG. 17, which can be used to perform the steps of the terminal device corresponding to the method 400 in FIG. 11. The terminal device 3000 shown in FIG. 20 includes a processor 3010, and the processor 3010 can call and run a computer program from the memory to implement the methods according to embodiments of the present disclosure.

According to embodiments, as shown in FIG. 20, the terminal device 3000 may further include a memory 3020. The processor 3010 may call and run a computer program from the memory 3020 to perform the methods in embodiments of the present disclosure.

The memory 3020 may be a separate device independent of the processor 3010, or may be integrated in the processor 3010.

According to embodiments, as shown in FIG. 20, the terminal device 3000 may further include a transceiver 3030, and the processor 3010 may control the transceiver 3030 to communicate with other devices. Specifically, the transceiver may send information or data to other devices, or receive information or data sent by other devices.

The transceiver 3030 may include a transmitter and a receiver. The transceiver 3030 may further include one or more antennas.

According to embodiments, the terminal device 3000 may specifically be the terminal device according to an embodiment of the present disclosure, and the terminal device 3000 may implement the corresponding processes implemented by the terminal device in the method embodiments of the present disclosure. For brevity, details are not repeated here.

In a specific implementation, the processing unit in the terminal device 700/800/900 may be implemented by the processor 3010 in FIG. 20. The transceiving unit in the terminal device 700/800/900 may be implemented by the transceiver 3030 in FIG. 20.

Figure 21:
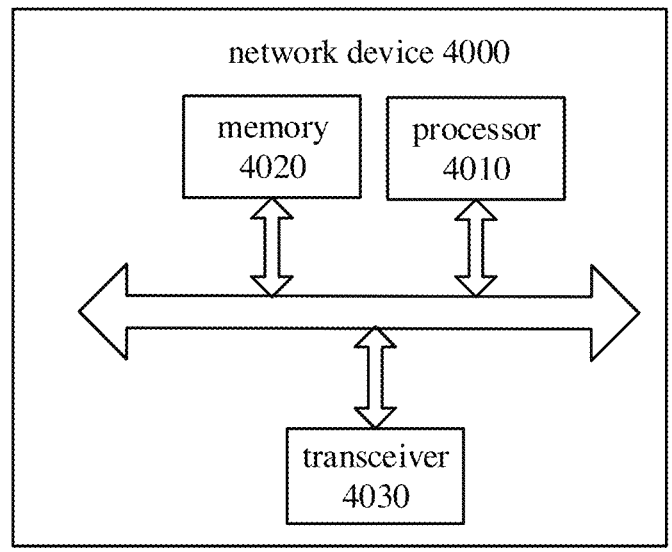
FIG. 21 is another schematic block diagram of a network device according to an embodiment of the present disclosure.

As shown in FIG. 21, an embodiment of the present disclosure further provides a network device 4000. The network device 4000 may be the network device 1000 in FIG. 18, which can be used to perform the steps of the network device corresponding to method 500 in FIG. 13. The network device 4000 may also be the network device 2000 in FIG. 19, which can be used to perform the steps of the network device corresponding to the method 600 in FIG. 14. The network device 4000 shown in FIG. 21 includes a processor 4010, and the processor 4010 can call and run a computer program from a memory to implement the methods in embodiments of the present disclosure.

According to embodiments, as shown in FIG. 21, the network device 4000 may further include a memory 4020. The processor 4010 may call and run a computer program from the memory 4020 to perform the methods in embodiments of the present disclosure.

The memory 4020 may be a separate device independent of the processor 4010, or may be integrated in the processor 4010.

According to embodiments, as shown in FIG. 21, the network device 3000 may further include a transceiver 4030, and the processor 4010 may control the transceiver 3030 to communicate with other devices. Specifically, the transceiver may send information or data to other devices, or receive information or data sent by other devices.

The transceiver 4030 may include a transmitter and a receiver. The transceiver 4030 may further include one or more antennas.

According to embodiments, the network device 4000 may specifically be the network device according to an embodiment of the present disclosure, and the network device 4000 may implement the corresponding processes implemented by the network device in the method embodiments of the present disclosure. For brevity, details are not repeated here.

In a specific implementation, the processing unit in the network device 1000/2000 may be implemented by the processor 4010 in FIG. 21. The transceiving unit in the network device 1000/2000 may be implemented by the transceiver 4030 in FIG. 21.

Figure 22:
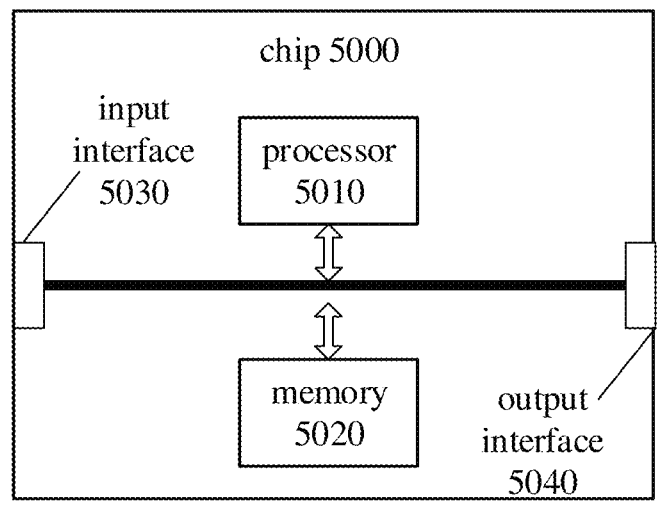
FIG. 22 is a schematic block diagram of a chip according to an embodiment of the present disclosure.

FIG. 22 is a schematic structural diagram of a chip according to an embodiment of the present disclosure. The chip 5000 shown in FIG. 22 includes a processor 5010, and the processor 5010 can call and run a computer program from a memory to implement the method according to embodiments of the present disclosure.

According to embodiments, as shown in FIG. 21, the chip 5000 may further include a memory 5020. The processor 5010 may call and run a computer program from the memory 5020 to implement the method according to embodiments of the present disclosure.

The memory 5020 may be a separate device independent of the processor 5010, or may be integrated in the processor 5010.

According to embodiments, the chip 5000 may further include an input interface 5030. The processor 5010 may control the input interface 5030 to communicate with other devices or chips, and specifically, the processor 5010 can control the input interface to obtain information or data sent by other devices or chips.

According to embodiments, the chip 5000 may further include an output interface 5040. The processor 5010 can control the output interface 5040 to communicate with other devices or chips, and specifically, the processor 5010 can control the output interface 5040 to output information or data to other devices or chips.

According to embodiments, the chip can be applied to the terminal device in embodiments of the present disclosure, and the chip can implement the corresponding processes implemented by the terminal device in various methods according to embodiments of the present disclosure. For brevity, details are not repeated herein again.

According to embodiments, the chip can be applied to the network device in embodiments of the present disclosure, and the chip can implement the corresponding processes implemented by the network device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 23:
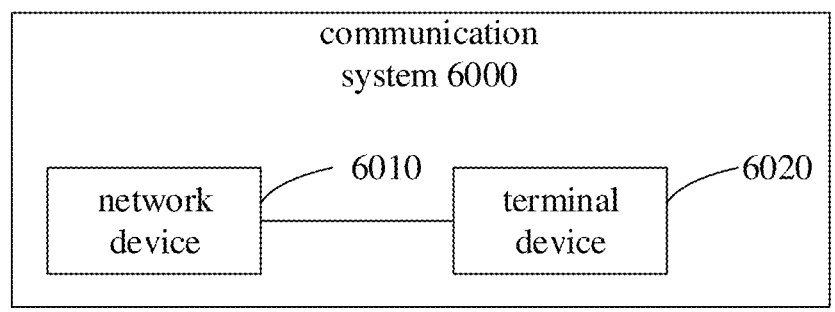
FIG. 23 is a schematic block diagram of a communication system according to an embodiment of the present disclosure.

FIG. 23 is a schematic block diagram of a communication system 6000 according to an embodiment of the present disclosure. As shown in FIG. 23, the communication system 6000 includes a network device 6010 and a terminal device 6020.

The network device 6010 may be used to implement the corresponding functions implemented by the network device in the foregoing methods, and the terminal device 6020 may be used to implement the corresponding functions implemented by the terminal device in the foregoing methods. For brevity, details are not repeated herein again.

It should be understood that the terms "system" and "network" herein are often used interchangeably. The term "and/or" is only an association relationship describing associated objects, which means that there can be three kinds of relationships, for example, A and/or B can mean three situations: A alone, B alone, and A and B together. In addition, the character "/" herein generally indicates that the associated objects before and after "/" are in an "or" relationship.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the terminal device in embodiments of the present disclosure, and the computer programs cause a computer to perform the corresponding processes implemented by the terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the terminal device in embodiments of the present disclosure, and the computer program instructions cause a computer to perform the corresponding processes implemented by the terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the terminal device in embodiments of the present disclosure, and when the computer program runs on a computer, the computer is caused to perform the corresponding processes implemented by the terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for information transmission, comprising:
when a transmission resource used to transmit uplink feedback information and a transmission resource used to transmit sidelink feedback information overlap in a time domain, sending, by a first terminal device, the uplink feedback information or the sidelink feedback information to a network device according to a first criterion;
obtaining, by the first terminal device, first configuration information, wherein the first configuration information is used to indicate a first transmission resource used to transmit the uplink feedback information; and
obtaining, by the first terminal device, second configuration information, wherein the second configuration information is used to indicate a second transmission resource used to transmit the sidelink feedback information, and the first transmission resource and the second transmission resource overlap in the time domain,
wherein the first transmission resource and the second transmission resource are both Physical Uplink Control Channel (PUCCH),
wherein the sidelink feedback information is sent from a second terminal device to the first terminal device;
wherein the sidelink feedback information comprises at least one of the following information:
sidelink HARQ ACK, or sidelink HARQ NACK; and
wherein the first criterion comprises a relationship between a value of a first attribute of sidelink data corresponding to the sidelink feedback information and a first threshold configured by a network;
wherein the first attribute of sidelink data comprises priority information, and
when a value of the priority information is greater than or equal to the first threshold, sending, by the first terminal device, the uplink feedback information to the network device; or when the value of the priority information is less than the first threshold, sending, by the first terminal device, the sidelink feedback information to the network device.

2. The method according to claim 1, wherein sending, by the first terminal device, the uplink feedback information or the sidelink feedback information to the network device comprises:
sending, by the first terminal device, the uplink feedback information on the first transmission resource or sending the sidelink feedback information on the second transmission resource.

3. The method according to claim 2, wherein the second configuration information is further used to indicate a transmission resource for transmitting sidelink data corresponding to the sidelink feedback information.

4. The method according to claim 2, wherein the second configuration information is transmitted by a first Physical Downlink Control Channel (PDCCH), and the first configuration information is transmitted by a second PDCCH.

5. The method according to claim 1, further comprising: receiving, by the first terminal device, the sidelink feedback information sent from the second terminal device.

6. The method according to claim 1, further comprising: when the sidelink feedback information sent from the second terminal device is not received by the first terminal device, determining, by the first terminal device, the sidelink feedback information to be sent to the network device as a negative acknowledgement (NACK).

7. The method according to claim 1, wherein the uplink feedback information comprises at least one of the following information:
Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), or Rank Indicator (RI).

8. A network device, comprising:
a memory for storing computer programs;
a transceiver; and
a processor,
wherein the processor is configured to execute the computer programs to control the transceiver to:
send first configuration information to a first terminal device, wherein the first configuration information is used to indicate a first transmission resource used to transmit uplink feedback information;
send second configuration information to a second terminal device, wherein the second configuration information is used to indicate a second transmission resource used to transmit sidelink feedback information, the first transmission resource and the second transmission resource overlap in a time domain, the sidelink feedback information is sent from the second terminal device to the first terminal device, and the first transmission resource and the second transmission resource are both Physical Uplink Control Channel (PUCCH),
wherein the sidelink feedback information comprises at least one of the following information:
sidelink HARQ ACK, or sidelink HARQ NACK; and
receive the uplink feedback information sent from the first terminal device on the first transmission resource, or receive the sidelink feedback information sent from the first terminal device on the second transmission resource, according to whether a value of a first attribute of sidelink data corresponding to the sidelink feedback information are smaller than a first threshold configured by a network;
wherein the first attribute of sidelink data comprises priority information, and
when a value of the priority information is greater than or equal to the first threshold, sending, by the first terminal device, the uplink feedback information to the network device; or
when the value of the priority information is less than the first threshold, sending, by the first terminal device, the sidelink feedback information to the network device.

9. The network device according to claim 8, wherein the second configuration information is further used to indicate a transmission resource for transmitting the sidelink data corresponding to the sidelink feedback information.

10. The network device according to claim 8, wherein the second configuration information is transmitted by a first Physical Downlink Control Channel (PDCCH), and the first configuration information is transmitted by a second PDCCH.

11. The network device according to claim 8, wherein the uplink feedback information comprises at least one of the following information:
Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), or Rank Indicator (RI).

12. A terminal device, wherein the terminal device is a first terminal device and comprises:
a memory for storing computer programs;
a transceiver; and
a processor,
wherein the processor is configured to execute the computer programs to control the transceiver to, when a transmission resource used to transmit uplink feedback information and a transmission resource used to transmit sidelink feedback information overlap in a time domain, send the uplink feedback information or the sidelink feedback information to a network device according to a first criterion;
obtain first configuration information, wherein the first configuration information is used to indicate a first transmission resource used to transmit the uplink feedback information; and
obtain second configuration information, wherein the second configuration information is used to indicate a second transmission resource used to transmit the sidelink feedback information, and the first transmission resource and the second transmission resource overlap in the time domain,
wherein the first transmission resource and the second transmission resource are both Physical Uplink Control Channel (PUCCH),
wherein the sidelink feedback information is sent from a second terminal device to the first terminal device;
wherein the sidelink feedback information comprises at least one of the following information:
sidelink HARQ ACK, or sidelink HARQ NACK; and
wherein the first criterion comprises a relationship between a value of a first attribute of sidelink data corresponding to the sidelink feedback information and a first threshold configured by a network;
wherein the first attribute of sidelink data comprises priority information, and when a value of the priority information is greater than or equal to the first threshold, sending, by the first terminal device, the uplink feedback information to the network device; or when the value of the priority information is less than the first threshold, sending, by the first terminal device, the sidelink feedback information to the network device.

13. The terminal device according to claim 12, wherein the processor is configured to execute the computer programs to control the transceiver to:

send the uplink feedback information on the first transmission resource or send the sidelink feedback information on the second transmission resource.

14. The terminal device according to claim 13, wherein the second configuration information is further used to indicate a transmission resource for transmitting sidelink data corresponding to the sidelink feedback information.

15. The terminal device according to claim 13, wherein the second configuration information is transmitted by a first Physical Downlink Control Channel (PDCCH), and the first configuration information is transmitted by a second PDCCH.

16. The terminal device according to claim 12, wherein the processor is configured to execute the computer programs to control the transceiver to:

receive the sidelink feedback information sent from the second terminal device.

17. The terminal device according to claim 12, wherein the processor is configured to execute the computer programs to:

when the sidelink feedback information sent from the second terminal device is not received by the first terminal device, determine the sidelink feedback information to be sent to the network device as a negative acknowledgement (NACK).

18. The terminal device according to claim 12, wherein the uplink feedback information comprises at least one of the following information:

Hybrid Automatic Repeat reQuest (HARQ) acknowledgement (ACK), HARQ negative acknowledgement (NACK), Channel State Information (CSI), Channel Quality Indicator (CQI), Precoding Matrix Indicator (PMI), Rank Indicator (RI).

* * * * *